(12) United States Patent
Parikh

(10) Patent No.: US 11,953,446 B2
(45) Date of Patent: *Apr. 9, 2024

(54) SYSTEM AND METHOD FOR PROCESSING MULTIPLE LOOSE GEMSTONES USING IMAGE-BASED ANALYSIS TECHNIQUES

(71) Applicant: Parikh Holdings LLC, Scarsdale, NY (US)

(72) Inventor: Aniket Parikh, Scarsdale, NY (US)

(73) Assignee: Parikh Holdings LLC, Scarsdale, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/571,019

(22) Filed: Jan. 7, 2022

(65) Prior Publication Data
US 2022/0215520 A1  Jul. 7, 2022

Related U.S. Application Data

(63) Continuation of application No. 17/104,615, filed on Nov. 25, 2020, now Pat. No. 11,222,420, which is a
(Continued)

(51) Int. Cl.
*G01N 21/87* (2006.01)
*G06F 18/22* (2023.01)
(Continued)

(52) U.S. Cl.
CPC ............ *G01N 21/87* (2013.01); *G06F 18/22* (2023.01); *G06Q 30/0283* (2013.01);
(Continued)

(58) Field of Classification Search
CPC .......... G01N 21/87; G01N 2021/8883; G06K 9/00671; G06K 9/4604; G06K 9/52; G06K 9/6201; G06K 9/6203; G06K 9/6215; G06K 9/6272; G06Q 30/0283; G06Q 30/0629; G06T 2207/30108; G06T 7/0002;
(Continued)

(56) References Cited

U.S. PATENT DOCUMENTS 10,380,734 B2 *  8/2019  Parikh ................... G06T 7/0002
11,222,420 B2 *  1/2022  Parikh ................... G06V 20/66
(Continued)

*Primary Examiner* — Farzana Hossain
(74) *Attorney, Agent, or Firm* — Leason Ellis LLP

(57) ABSTRACT

Systems and methods for processing a plurality of loose gemstones resting on a worksurface are disclosed. The system comprises an image capturing device for capturing an image of the plurality of loose gemstones on the worksurface. The system further comprises a computing device having a non-transitory computer-readable storage medium and a processor. Additionally, the processor is configured by executing a software application to analyze the image to detect edges of objects within the image and generate a diagram representing the detected edges of the gemstones. The processor is further configured to detect, using a trained neural network processing the image and the diagram, individual gemstones within the image and count the individual gemstones detected within the image to determine a gemstone count. The processor is also configured to perform, using an output device, a processing operation on the gemstones as a function of the gemstone count.

22 Claims, 21 Drawing Sheets

Related U.S. Application Data continuation-in-part of application No. 17/062,114, filed on Oct. 2, 2020, now Pat. No. 11,232,553, which is a continuation-in-part of application No. 16/455,195, filed on Jun. 27, 2019, now Pat. No. 10,825,166, which is a continuation of application No. 15/442,797, filed on Feb. 27, 2017, now Pat. No. 10,380,734.

(51) Int. Cl.

| | | |
|---|---|---|
| *G06Q 30/0283* | (2023.01) | |
| *G06Q 30/0601* | (2023.01) | |
| *G06T 7/00* | (2017.01) | |
| *G06T 7/73* | (2017.01) | |
| *G06V 10/44* | (2022.01) | |
| *G06V 10/75* | (2022.01) | |
| *G06V 10/764* | (2022.01) | |
| *G06V 20/20* | (2022.01) | |
| *G06V 20/66* | (2022.01) | |

(52) U.S. Cl.
CPC ....... *G06Q 30/0629* (2013.01); *G06T 7/0002* (2013.01); *G06T 7/001* (2013.01); *G06T 7/74* (2017.01); *G06V 10/44* (2022.01); *G06V 10/75* (2022.01); *G06V 10/7515* (2022.01); *G06V 10/764* (2022.01); *G06V 20/20* (2022.01); *G06V 20/66* (2022.01); *G06T 2207/30108* (2013.01)

(58) Field of Classification Search
CPC ... G06T 7/001; G06T 7/62; G06T 7/74; G06F 18/22; G06V 10/44; G06V 10/75; G06V 10/7515; G06V 10/764; G06V 20/20; G06V 20/66

See application file for complete search history.

(56) References Cited

U.S. PATENT DOCUMENTS

| | | | | |
|---|---|---|---|---|
| 2005/0011226 | A1* | 1/2005 | So | A44C 17/001 63/32 |
| 2005/0246239 | A1* | 11/2005 | Yeko | G06Q 30/0613 705/26.41 |
| 2014/0052563 | A1* | 2/2014 | Watkins | G06Q 30/0621 705/26.5 |
| 2014/0139608 | A1* | 5/2014 | Rosario | B23K 26/359 347/225 |
| 2016/0006929 | A1* | 1/2016 | Gaywala | H04N 5/2256 348/135 |
| 2016/0232432 | A1* | 8/2016 | Regev | G06V 20/69 |
| 2020/0074478 | A1* | 3/2020 | Peters | G06Q 10/0831 |
| 2020/0364846 | A1* | 11/2020 | Tong | G06V 20/66 |
| 2021/0156807 | A1* | 5/2021 | Tsai | G01N 21/87 |
| 2021/0293729 | A1* | 9/2021 | Connell | G01N 33/24 |

\* cited by examiner

August 03, 2016

Report type............................... Grading Report
GIA Report Number ........................ 5172771044
Shape and Cutting Style................... Round Brilliant
Measurements ..................... 6.36 - 6.39 x 4.13 mm Carat Weight ............................... 1.07 carat
Color Grade ........................... Very Light Gray
Color Origin................................... Natural
Color Distribution ...................... Not Applicable
Clarity Grade ..................................... SI2
Proportions

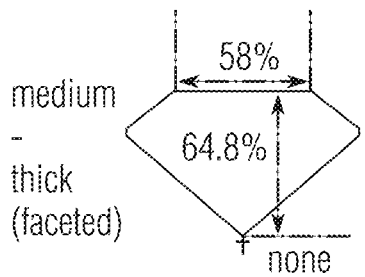

Profile not to actual proportions

Polish.................................... Very Good
Symmetry.................................. Excellent
Fluorescence ................................... None
Comments: Additional clouds, pinpoints and surface graining are not shown.

FIG. 5

SYSTEM AND METHOD FOR PROCESSING MULTIPLE LOOSE GEMSTONES USING IMAGE-BASED ANALYSIS TECHNIQUES

CROSS-REFERENCE TO RELATED APPLICATION

This application is a continuation of, and claims priority from, U.S. patent application Ser. No. 17/104,615, filed on Nov. 25, 2020, now U.S. Pat. No. 11,222,420, issued Jan. 11, 2022, titled SYSTEM AND METHOD FOR PROCESSING MULTIPLE LOOSE GEMSTONES USING IMAGE-BASED ANALYSIS TECHNIQUES, which is hereby incorporated by reference herein in its entirety.

FIELD OF THE INVENTION

The invention relates to systems and methods for processing gemstones, and in particular, systems and methods for processing large quantities of gemstones using image-based analysis techniques.

BACKGROUND OF THE INVENTION

Jewelry and gemstone merchants often deal in relatively large quantities of loose gemstones on the order of tens, hundreds and even thousands of units. Processing multiple loose gemstones is often performed manually. As an example, processing can include counting, sorting, categorizing, evaluating and selecting gemstones, say, for inclusion in a jewelry item. Manual processing is time consuming and labor intensive. Existing systems for processing gemstones using computer vision systems implementing image-based analysis techniques can lack reliability when processing images depicting relatively large quantities of loose gemstones.

It is in regard to these and other problems in the art that the present disclosure is directed to provide a technical solution for an effective system and method for automated processing of multiple loose gemstones using image-based analysis techniques.

SUMMARY OF THE INVENTION

According to an aspect of the present disclosure, a method for processing a plurality of loose gemstones resting on a worksurface is disclosed. The method is implemented by a computing device having a non-transitory computer-readable storage medium and a processor configured by executing a software program stored in the storage medium. The method comprises the step of receiving by the processor, from an image capturing device, an image of the plurality of loose gemstones on the worksurface. The method further includes the step of analyzing, by the processor, the image to detect edges of objects within the image and generating a diagram representing the detected edges of the gemstones. The method also includes the step of detecting individual gemstones within the image by the processor using a trained neural network processing the image and the diagram and counting the individual gemstones detected within the image to determine a gemstone count. Additionally, the method includes the step of performing, by the processor, a processing operation on the gemstones as a function of the gemstone count.

According to a further aspect of the disclosure a system for processing a plurality of loose gemstones resting on a worksurface. The system comprises an image capturing device for capturing an image of the plurality of loose gemstones on the worksurface. The system further comprises a computing device having a non-transitory computer-readable storage medium and a processor. Additionally, the processor is configured by executing a software application to analyze the image to detect edges of objects within the image and generate a diagram representing the detected edges of the gemstones. The processor is further configured to detect, using a trained neural network processing the image and the diagram, individual gemstones within the image and count the individual gemstones detected within the image to determine a gemstone count. The processor is also configured to perform, using an output device, a processing operation on the gemstones as a function of the gemstone count.

It is with respect to these and other considerations that the disclosure made herein is presented.

BRIEF DESCRIPTION OF THE DRAWINGS

FIG. 5 illustrates an exemplary diamond report of Gemological Institute of America;

DETAILED DESCRIPTION

Figure 1:
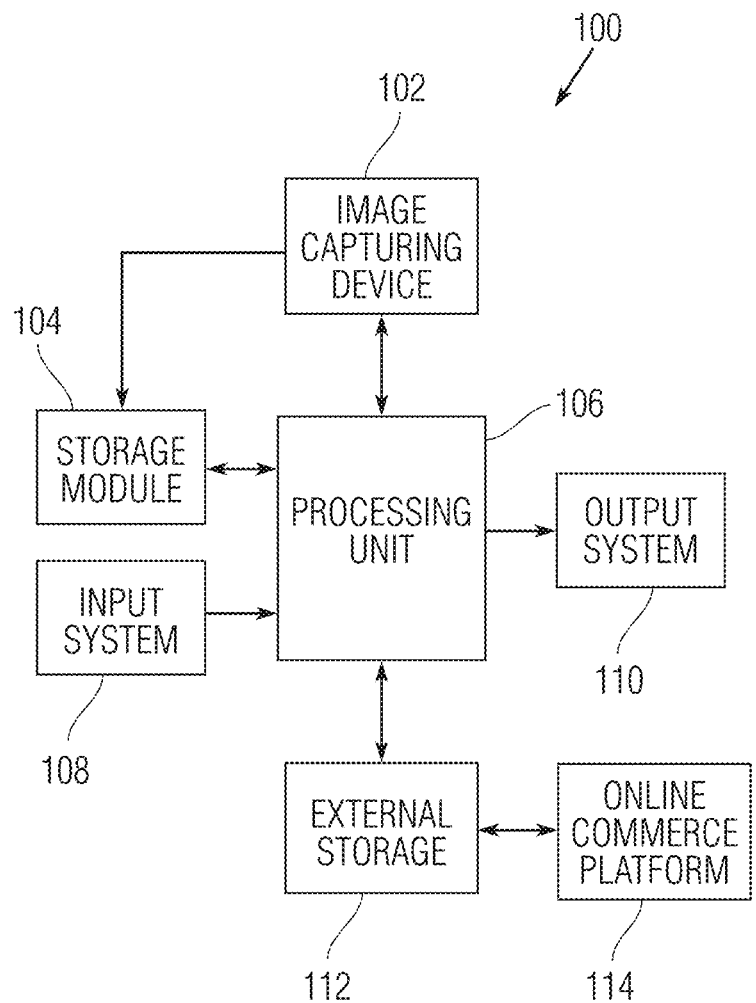
FIG. 1 illustrates a block diagram of a system embodying the teachings of the present invention.

While the disclosed subject matter is amenable to various modifications and alternative forms, specifics thereof have been shown by way of example in the drawings and will be described in detail. It should be understood, however, that the intention is not to limit aspects of the invention to the particular embodiments described. The intention is to cover all modifications, equivalents, and alternatives falling within the spirit and scope of the invention.

The following detailed description is made with reference to the figures. Exemplary embodiments are described to illustrate the subject matter of the disclosure, not to limit its scope, which is defined by the claims. Those skilled in the art will recognize that the various elements described and/or shown may be arranged in various combinations and configurations without departing from the scope of the disclosure.

All numbers or values are herein assumed to be modified by the term "about." The disclosure of numerical ranges by endpoints includes all numbers subsumed within that range (e.g., 1 to 5 includes 1, 1.5, 2, 2.75, 3, 3.80, 4, and 5).

As used in this specification and the appended claims, the singular indefinite articles "a", "an", and the definite article "the" should be considered to include or otherwise cover both single and plural referents unless the content clearly dictates otherwise. In other words, these articles are applicable to one or more referents. As used in this specification and the appended claims, the term "or" is generally employed to include or otherwise cover "and/or" unless the content clearly dictates otherwise.

FIG. 1 illustrates a block diagram of a system 100 embodying the teachings of the present invention. The system 100 includes an image capturing device 102 for capturing multiple images of a jewelry item. The image capturing device 102 takes images from various angles of the jewelry item including the gemstones, metal parts and the prongs. The physical characteristics of the jewelry item including the appearance, shape, size, measurements (length, width and depth) and color are captured through the images. The captured images can be in form of still images, video images or laser based topography model of the jewelry item. Exemplary image capturing device includes an analog or digital still image camera, a video camera, an optical camera, a laser camera, a laser or 3D image scanner, or any other device capable of capturing high resolution images of the jewelry item. The image capturing device 102 can also be a high definition inbuilt camera of a communication device such as a computer, a laptop or a mobile phone.

Figure 4:
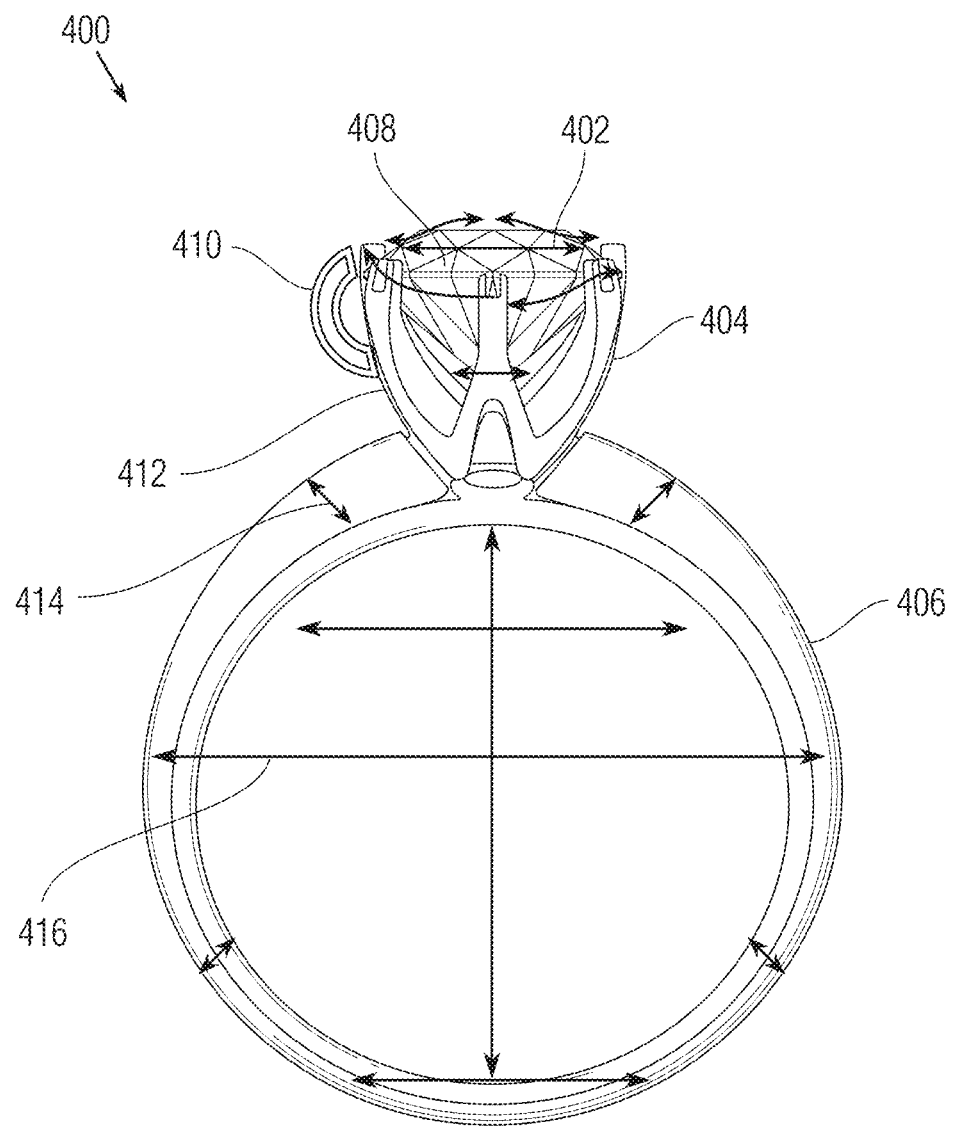
FIG. 4 illustrates the image of the jewelry item having a gemstone.

In an exemplary embodiment, the image capturing device can take multiple images of the jewelry item and stitch the images to get a 360° view. Alternatively, the 360° view can be captured using the panoramic view technology of the image capturing device 102. In a further alternative embodiment, the video image of the jewelry item is captured and still images are extracted from the video frames. FIG. 4 illustrates an image of a jewelry item 400 having a gemstone 402. The image capturing device 102 takes 3D images of the metal part 406, the gemstone 402 and the prongs 404.

The image capturing device 102 also captures the image of inclusions in the gemstone of the jewelry item. Examples of inclusions which may be captured include one or more of solid, liquid or gas inclusions, internal fissures, fractures, zones of crystal growth, stress cracks, bubbles, cleavage fault, feather, halo inclusions, two-phase and three-phase inclusions, etc. The image capturing device 102 further captures identification markings or inscriptions on the surface of the metal part or the gemstone of the jewelry item. Any nicks, scratches, dents, placements, table facets, bottom facets of gemstone, color change under lighting conditions, girdle facets and thickness are also captured through images.

The captured images through image capturing device 102 are stored in a storage module 104. The storage module 104 also stores a time stamp comprising the date and time and a location of capturing and storing the images. The storage module 104 can be an inbuilt storage memory of the image capturing device 102, for example the internal memory of a camera device. In an alternative embodiment, the storage module 104 can be storage memory of one or more of a server computer, a client user computer, a personal computer (PC), a tablet PC, a laptop computer, a desktop computer, a mobile phone, a control system and a network router, switch or bridge. Alternatively, the storage module 104 can be cloud storage of a virtual cloud environment.

The stored images are provided to a processing unit 106 for extracting the information from images and processing it for security analysis of the jewelry item. A user (herein 'user' refers to a jewelry owner, manufacturer, lab person, etc. and will be considered for the description below) can provide additional information of the jewelry item to the processing unit 106 through an input system 108. The additional information can be related to physical characteristics of the metal part and the gemstone like weight, volume, dimensions, carat, cut grade, color rating, etc. The user can also input information relating to price, labor, etc. of the jewelry item. A certificate or lab report of the jewelry item can also be entered manually or uploaded though the input system 108. FIG. 5 shows an exemplary diamond report of Gemological Institute of America. The report shows the physical characteristics of the diamond along with an image. Examples of input system 108 include a keyboard, a touch panel, an electronic or optical mouse, a gesture recognition system and a voice input system. The input system 108 provides the additional information through a user interface of software, a website or a mobile application.

The processing unit 106 extracts information from the jewelry item images captured at different time intervals using a software program and compare the information for detecting any changes in the metal part or gemstones of the jewelry item. The processing unit 106 can be an internal CPU of the image capturing device 102 like a digital camera. In an alternative embodiment of the present invention, the processing unit 106 can be the processing unit of one or more of a server computer, a client user computer, a personal computer (PC), a tablet PC, a laptop computer, a desktop computer, a mobile phone, a control system and a network router, switch or bridge. The processed information from the processing unit 106 is stored in the storage module 104 or an external storage 112.

The processed information of the jewelry item by the processing unit 106 is sent to an output system 110 which displays the information to the user. The output system 110 can display the information pertaining to the physical characteristics of the jewelry item including the appearance, shape, size, volume, weight, measurements (length, width and depth) and color. The information related to inclusions in the gemstones, inscriptions on the metal part and gemstones, nicks, scratches, dents, placements, angles of jewelry and prongs, stone quality, table facets, bottom facets of gem, girdle facets and thickness, weights and or all known and deduced information from the jewelry can be displayed to the user. All the above-mentioned information is extracted from the images of jewelry item taken at different time interval for comparison and reference. The time stamp related to capturing and storing the images are also displayed through the output system 100. In a preferred embodiment of the present invention, the output system 110 also shows the difference in prong settings of the jewelry item, holding the gemstones, before sending it for repairment and after receiving it from repairment. The processing unit 106 calculates the difference in the metal part and the gemstone based on the changes in the prong settings of the jewelry item. The difference in the metal part and the gemstone is also shown to the user as the actual value or a percentage of the difference. The output system 110 can also display an alert or a flag if the difference calculated by the processing unit 106 is more than a predefined threshold limit. The output system 110 can also display the information in form of a certificate including the physical characteristics and images of the jewelry item. The output system 110 can also show the valuation of the jewelry item calculated from the images of different time intervals. The difference in valuation is also shown to the user.

The external storage 112, which can be memory storage of a remote computer, a laptop, a mobile phone, a network router, a switch, a bridge or a virtual space in a cloud environment, is connected to an online commerce platform 114. The online commerce platform 114 enables the user to display the jewelry item, evaluate it by comparing with other similar jewelry items from other websites and sell the jewelry item. The online commerce platform 114 displays the physical characteristics and selling price of the jewelry item. The user can also select and buy or sell jewelry items from the online commerce platform 114 using an appropriate payment method.

Figure 2:
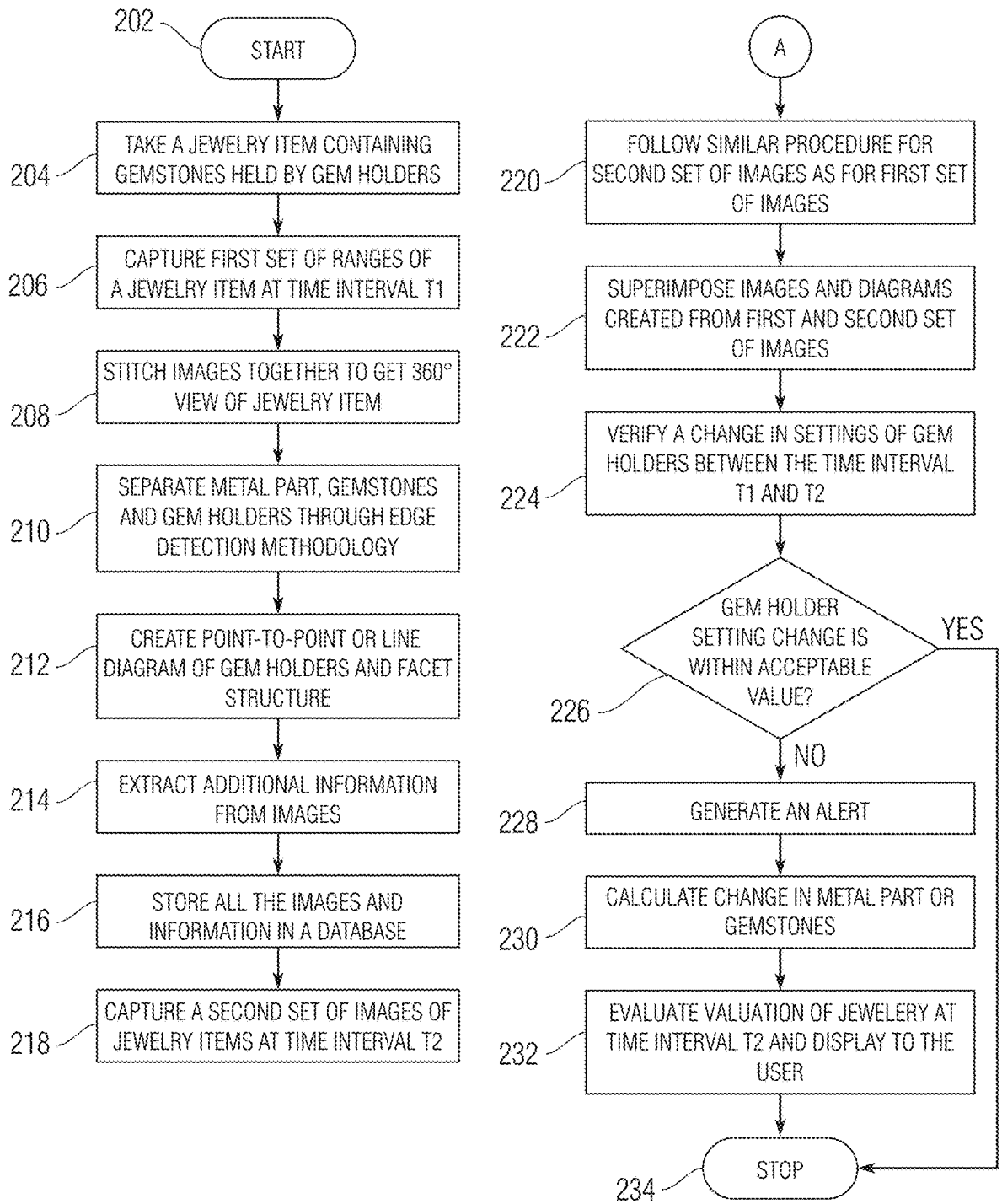
FIG. 2 illustrates a flowchart showing steps in an exemplary method for verification of a jewelry item.

FIG. 2 illustrates a flowchart showing steps for verification of a jewelry item. The process starts at step 202 and a jewelry item containing gemstones held by gem holders (prongs) is taken at step 204. At step 206 the image capturing device 102 takes a first set of images of the jewelry item at time interval T1. In an exemplary embodiment of the present invention, the time interval T1 is considered as the time before the jewelry item is sent to the jeweler for repair. The time T1 can also be any arbitrary time at which the images of jewelry item are taken and stored for reference in future. The images can also be captured at regular intervals by the user to keep a track of the wear and tear in the jewelry item with time. The first set of images includes the images of metal part, gemstones and the prongs of the jewelry item. In case the gemstones are missing or fallen from the jewelry item, the images of empty prongs are also captured. If the user provides the gemstones separately to the jeweler for fitting on the jewelry item, the images of gemstones are also captured for comparison with the jewelry item after it returns from the jeweler. The images are captured at high resolution to enable magnification for easy viewing and comparison. The captured images are stored in the storage module 104.

At step 208, the first set of images are stitched together to get a complete view of the jewelry item. The images can be stitched by the image capturing device 102. Alternatively, the images can be stitched by the processing unit 106. The stitched images are also stored in the storage module 104. A software algorithm running on the processing unit 106 extracts information from the first set of images and separates out the metal part, gemstones and the prongs of the jewelry item using an edge detection methodology at step 210. The algorithm creates a point-to-point or line diagram of the complete jewelry item including prongs and the facet structure at step 212 and separates out the various parts. The edge detection methodology is well known in the art and will not be discussed here in detail for the purpose of brevity of the subject. It should, however, be understood to a person skilled in the art that any other known technology can be used to separate the various parts of the jewelry item. The algorithm extracts one or more of the following information from the first set of images at step 214:

Metal part dimensions, volume, angle, color and weight
Metal quality/caratage
Nicks, scratches, dents, cracks on the metal part or gemstones
Inclusions in the gemstones
Identification markings or inscriptions on the metal part and gemstones
Table facet structure and girdle structure of gemstones
Angle and height of gemstones
Pavilion depth and angle
Crown height and angle
Weight and color of the gemstones
Coverage of the gemstone surface area, i.e., is it too short (near edge) or too high (towards table) or correct distance
Distance between the prongs
How the prongs are placed in respect to one another and in respect to the gemstones
Height and thickness of the prongs
Facet structure and angles of the prongs
Angle of curvature of the prong and its angle (facing others) compared to other prongs
How high the gemstone is set in comparison to the prongs and to the other gemstones relatively
Size and quality of any gemstone fallen or needs to be replaced
Placement of the gemstones in relation to the prongs
Are the gems overlapping each other or too near?
Are the prongs touching the gem or not secure?
Check size and shape of prongs next to it and around it and other areas. Are they same or for similar gems sizes and types?

Are the Prongs of same type? How many types? How many of each type?

The information mentioned above is exemplary and should not limit the scope of the invention. It should be clearly understood that the algorithm can extract any other information from the first set of images required for verification of the jewelry item.

The frontal view of a jewelry item 400 is illustrated in FIG. 4. The algorithm calculates the dimensions of various parts from the image of the jewelry item 400. Exemplary dimensions include girdle and table facet of gemstone and placement (408), angle of prong when bent and color recognition and/or outline of tips and sides and height of prong (410), thickness of prong & angle of bending from side view (412), volume and point to point marking to check for changes (414) and facial recognition of the ring using prongs, facet placement and inclusions etc. as markers (416).

Figure 6:
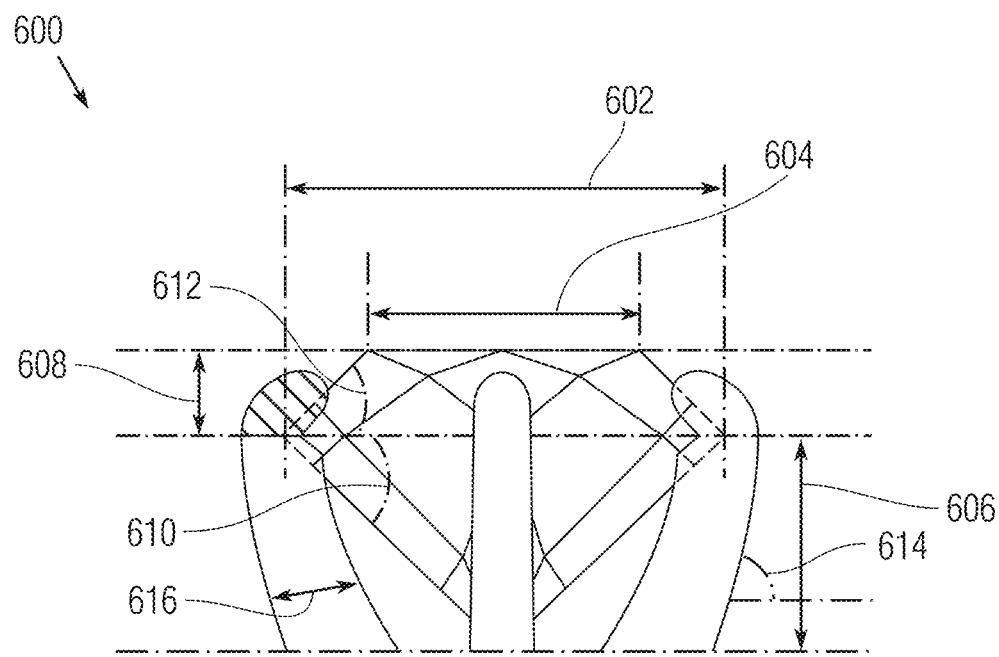
FIG. 6 illustrates a line diagram of the jewelry item.

FIG. 6 illustrates a line diagram of a jewelry item 600 created by the processing unit 106 from the first set of images. Some of the exemplary dimensions calculated from the line diagram include girdle diameter (602), table diameter (604), pavilion depth (606), crown height (608), pavilion angle (610) and crown angle (612) of the gemstone, angle of prong (614) and width of prong (616).

At step 216, the images, diagrams and extracted information is stored in the storage module 104. At step 218, a second set of images are captured at time interval T2 by the image capturing device 102. In a preferred embodiment of the present invention, the time interval T2 is the time when the jewelry item is returned from the jeweler after repairment. The time T2 can also be any arbitrary time at which the images of jewelry item are captured and stored for reference, for example, to check for wear and tear in the jewelry item. Similar steps were followed for second set of images as for the first set of images to separate the metal part, gemstones and prongs and extract the information from images at step 220. The second set of images, diagrams and extracted information are also stored in the storage module 104.

In an alternative embodiment of the present invention, the different set of images of the jewelry item can be captured at regular intervals of time to check for wear and tear and changes in the metal part and gemstones. These set of images can act as DNA map of the jewelry item to identify the changes happened in due course of time. The image data along with a passkey is passed along to the next owner/handler of the jewelry item. Updates to the item or verification of the item (re-check) for any changes made between first photo and receipt of physical delivery can be carried out before acceptance of the item using new photos and running the application to verify authenticity. If the old photo and new photo match and acceptance finalized, the passkey can be updated with the new ownership. These images can be provided to insurance companies, police, pawn shops and prospective buyers, etc. They can also get passkey from the user of jewelry item so that they can verify the authenticity, chain of ownership and accurate breakdown of the constituent products. The matching prongs and gemstone verification can allow the buyers to pay or value the metal part and gemstones much closer and more accurately. It can also let police and insurance companies to search the database if lost or stolen jewelry items are found. It further gives pawn shops or money lenders a better idea to ownership so that they have less risk while accepting to pawn the item. If a manufacturer makes multiple piece of the same jewelry item, it enables him to keep track of all the individual pieces accurately.

Figures 7A, 7B:
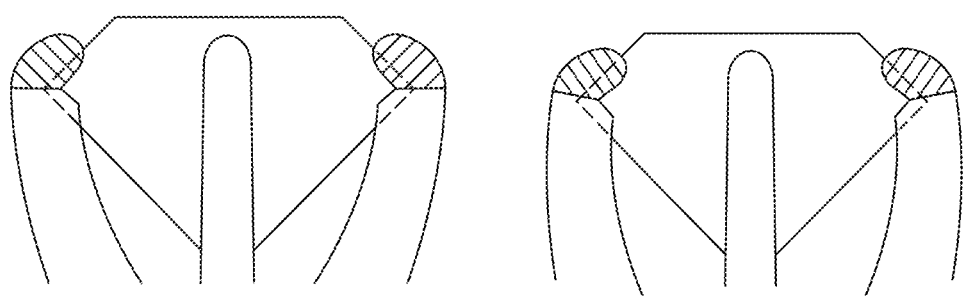
FIG. 7a illustrates a line diagram of the jewelry item at a time interval T1.
FIG. 7b illustrates a line diagram of the jewelry item at a time interval T1.
Figure 7C:
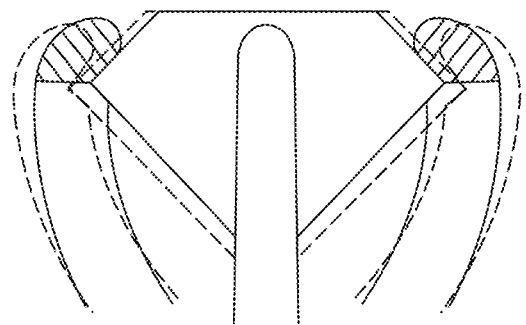
FIG. 7c shows the superimposed image of FIG. 7a and FIG. 7b.

The first set and second set of images and the line diagrams created from the images are superimposed at step 222 to verify a change in the images between the time interval T1 and T2. FIGS. 7a and 7b illustrates the line diagrams the jewelry item created from first and second set of images, respectively. FIG. 7c shows the superimposed image of FIGS. 7a and 7b to verify changes in the prongs settings of the jewelry item at step 224. For example, the changes in distance between the prongs, height and thickness of the prongs, position of prongs with respect to the gemstones, angle of curvature of the prongs and its angle compared to other prongs, prong to prong height and seat size ratios, etc. It should be clearly understood that the above mentioned parameters are exemplary and the algorithm can take into account various other parameters required for verifying the changes in prong settings. The algorithm calculates these changes on pixel-to-pixel basis from the superimposed image and displays all the changes on the output system 110. The algorithm checks if the changes are within a predefined threshold limit at step 226 and generates an alert or a flag if any of the change is more than the threshold limit at step 228. Based on the changes in the prongs, the algorithm calculates the changes in metal part and gemstones of the jewelry item at step 230. For example, changes in dimensions of the gemstone (crown height, pavilion depth, table diameter, pavilion angle, crown angle, etc.), size and volume of the metal part, etc. This enables the user to know what changes have been done to the jewelry item during repair and whether these changes are within the acceptable limit. In an exemplary embodiment, if the gemstone needs to be replaced in the jewelry item, the user can verify from the output information if the replaced gemstone matches the value and size of the previous gemstone. If the size varies more than an algorithmic value, question can be raised to the jeweler who replaced the gemstone. If the algorithm includes the capability of automatic appraisal of the jewelry item, it evaluates the valuation of the jewelry item at time interval T2 and displays it to the user at step 232 on the output system 110. This enables the user to compare the valuation of jewelry item at time T2 with the known valuation at time T1. The process stops at step 234.

Figures 8A, 8B:
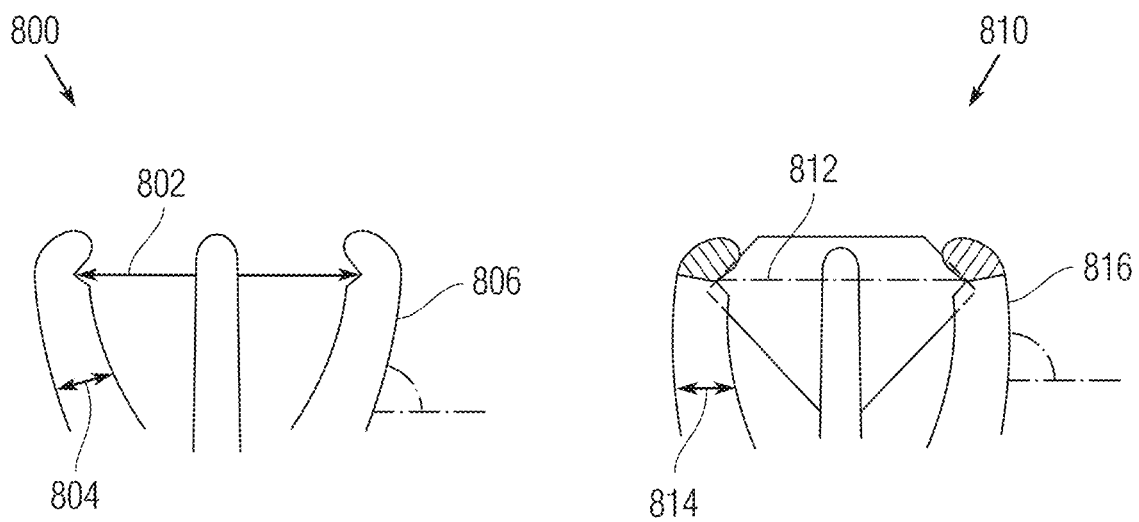
FIG. 8a illustrates a line diagram of the jewelry item with gemstone removed from the prongs at time interval T1.
FIG. 8b illustrates a line diagram of the jewelry item at time interval T2 after the gemstone is set between the prongs.

FIG. 8a illustrates a line diagram of the jewelry item with gemstone removed from the prongs at time interval T1. The software algorithm running on the processing unit 106 calculates the distance between the prongs 802, width of the prong 804 and angle of curvature of the prong 806. The algorithm can also estimate the size and weight of a gemstone which can be best fitted between the prongs. The calculated values are stored in the storage module 104. In an exemplary embodiment, the images of jewelry item, the line diagram 800 and the calculated values are sent to a jeweler to know if the jeweler has the gemstone of required size and weight. If the required gemstone is available in stock, the jeweler sends the image of the gemstone to the user for reference. The jewelry item is then sent to a jeweler for setting the gemstone between the prongs. The jewelry item is received from the jeweler with fitted gemstone and its images are again captured. FIG. 8b illustrates a line diagram of the jewelry item at time interval T2 after a gemstone is set between the prongs. The software algorithm again calculates the distance between the prongs 812, width of the prong 814 and angle of curvature of the prong 816. The calculated values are stored in the storage module 104. The algorithm calculates the difference between the corresponding stored values to verify the changes and displays it on the output system 110. An alert or a flag is generated if the difference is more than predefined values (considering wear and tear during setting of the gemstone). In such a scenario, the user can question the jeweler to verify for the fitted gemstone and the loss of metal part.

Figure 9A:
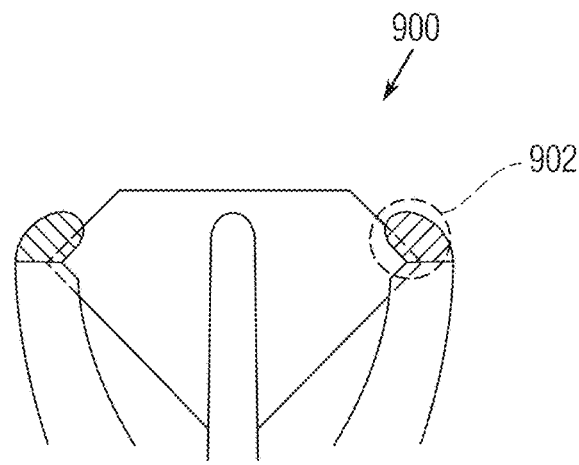
FIGS. 9a and 9b illustrates the line diagrams of the jewelry item with different prong size at time interval T1 and T2, respectively.
Figure 9B:
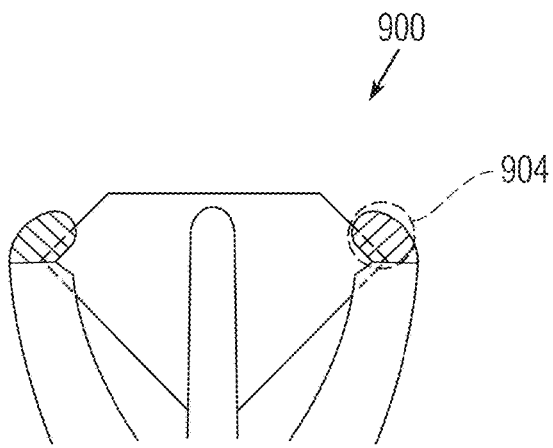

FIGS. 9a and 9b illustrates the line diagrams of a jewelry item 900 at time interval T1 and T2, respectively. The prong size 904 has been changed at time interval T2 when the jewelry item is received from the jeweler after repairment. The software algorithm calculates the difference between the prong sizes 902 and 904 and generates an alert accordingly.

Figure 10:
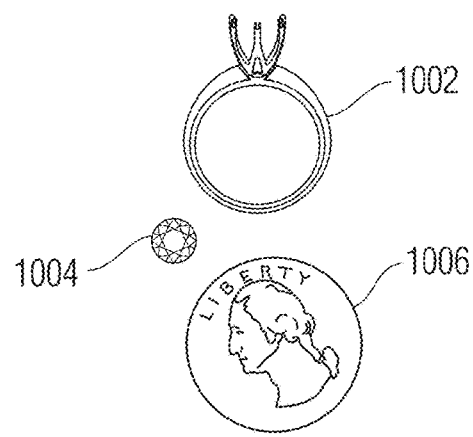
FIG. 10 shows an image of a ring, a gemstone and a standard size coin.

In an alternative embodiment, the user has the gemstone to be fitted in the jewelry item. The user clicks an image of the jewelry item and the gemstone along with an object of standard size (for example coin). This enables the user to know the actual size of the jewelry item and the gemstone, irrespective of the image zoom size, by comparing it with the standard size of the coin. FIG. 10 shows an image of a ring 1002, a gemstone 1004 and a standard size coin 1006. The actual size of ring 1002 and the gemstone 1004 can be easily known by comparing it with coin 1006. The software algorithm running on the processing unit 106 also extracts the information of inclusions in the gemstone 1004 and identification markings on the ring 1002 and gemstone 1004 (if any). The algorithm compares the information to verify the changes in the ring 1002 and the gemstone 1004 between the time intervals T1 and T2.

In a further embodiment, the present invention provides a security in buying a jewelry item through an e-commerce platform. The e-commerce platform can provide 360° images of the jewelry items to a buyer including the gemstones, metal part and the prongs. The buyer can store the images in the storage module 104 and process it using the software algorithm running on the processing unit 106. The algorithm extracts all the information from the images and stores in the storage module 104. After the actual receipt of the jewelry item by the buyer, the images are again captured and information is extracted by the algorithm. The extracted information is compared with the stored information to verify if the same jewelry item is received. This helps to detect any fraud by the company of e-commerce platform or during the transit of the jewelry item.

Figure 11A:
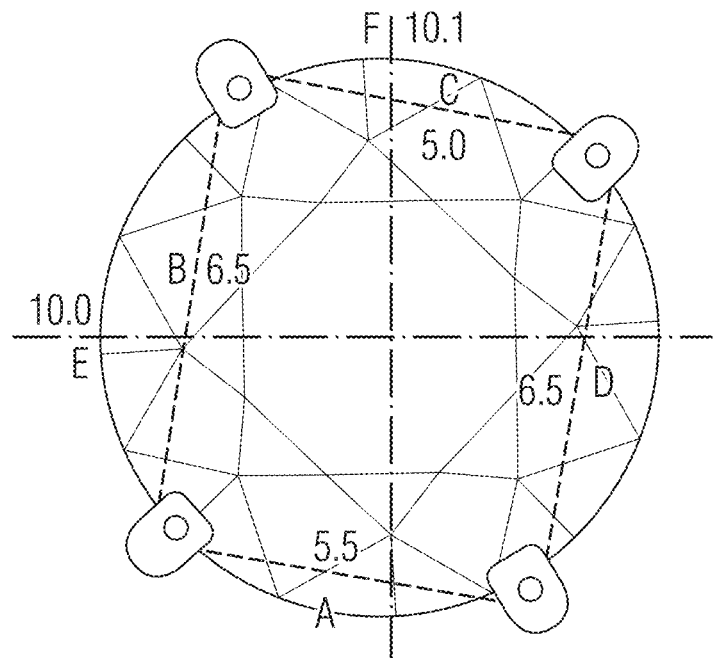
FIG. 11a illustrates the top view of the jewelry item with an initial set gemstone.
Figure 11B:
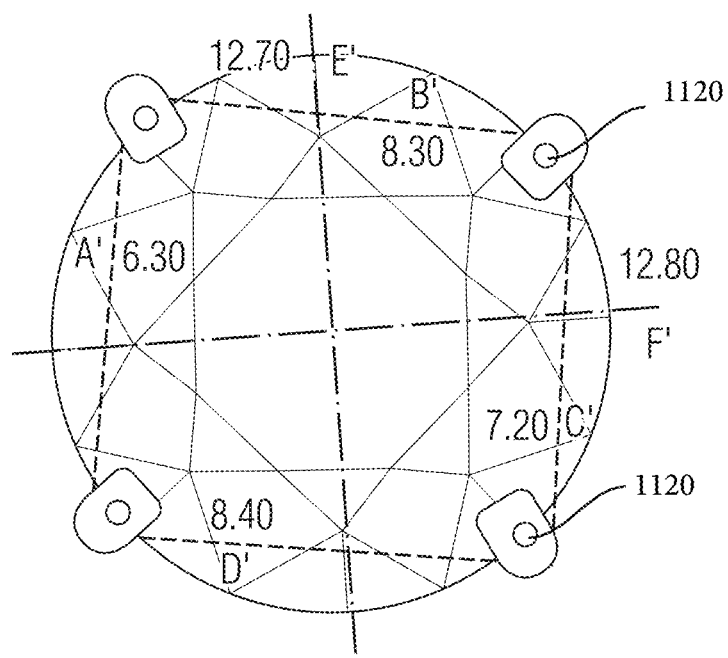
FIG. 11b illustrates the top view of the jewelry item with the same gemstone reset in the jewelry item.

FIG. 11a illustrates the top view of a jewelry item with an initial set gemstone. FIG. 11b illustrates the top view of the jewelry item with the same gemstone reset in the jewelry item. The FIGS. 11a and 11b shows various dimensions of the gemstone and the prongs. The tips of the prongs have also been changed before and after reset of the diamond as shown in FIGS. 11a and 11b. It should be noted that the figures are for illustrative purpose and are not drawn to scale.

Diamond size (as obtained from diamond lab report) –

$$6.36 - 6.39 \times 4.13 \text{ mm}$$

Ratio of the diamond size = 6.36/6.39 = 0.995305

Ratio of the lines passing through the diagonal of the gemstone:

$$E'/12.70/10.00 = 1.27$$

$$F'/12.80/10.10 = 1.267$$

Calculating the percentage difference between the calculated values and diamond size $$12.80 \times 0.995305 = 12.734$$

Percentage (%) error = (12.80 − 12.734)/12.80 × 100 = 0.549 < 1%

Therefore, the deviation in the prong setting will be acceptable if the difference in corresponding values of FIGS. 11a and 11b is less than 1%.

Considering the prong to prong distance in FIG. 11a

1. $A: 5.55 \times (1.27, 1.267) = \text{Average}(7.0485, 7.03185) \pm 1\% = 6.969$
2. $B: 6.50 \times (1.27, 1.267) = \text{Average}(8.255, 8.2355) \pm 1\% = 8.327$
3. $C: 6.00 \times (1.27, 1.267) = \text{Average}(7.62, 7.602) \pm 1\% = 7.687$
4. $D: 6.50 \times (1.27, 1.267) = \text{Average}(8.255, 8.2355) \pm 1\% = 8.327$ Comparing the calculated values from the above equations 1, 2, 3, 4 with the prong to prong distance in FIG. 11b 1. $A': (6.80 - 6.969)/6.80 \times 100 = 2.49\%$ (not acceptable value greater than 1%)

2. $B': (8.30 - 8.327)/8.30 \times 100 = 0.333\%$ (acceptable value less than 1%)

3. $C': (7.20 - 7.687)/7.20 \times 100 = 6.765\%$ (not acceptable value greater than 1%)

4. $D': (8.40 - 8.327)/8.40 \times 100 = 0.860\%$ (acceptable value less than 1%)

In general, 2 prongs are needed to be opened to remove the gemstone from the jewelry item. The percentage change in the prong to prong distance after resetting can conclude which prongs were opened during repairment. For the calculated values which have more than 1% deviation in the above equations, the software algorithm running on processing unit 106 will generate an alert or a flag which will be displayed on the output system 110.

Figure 3:
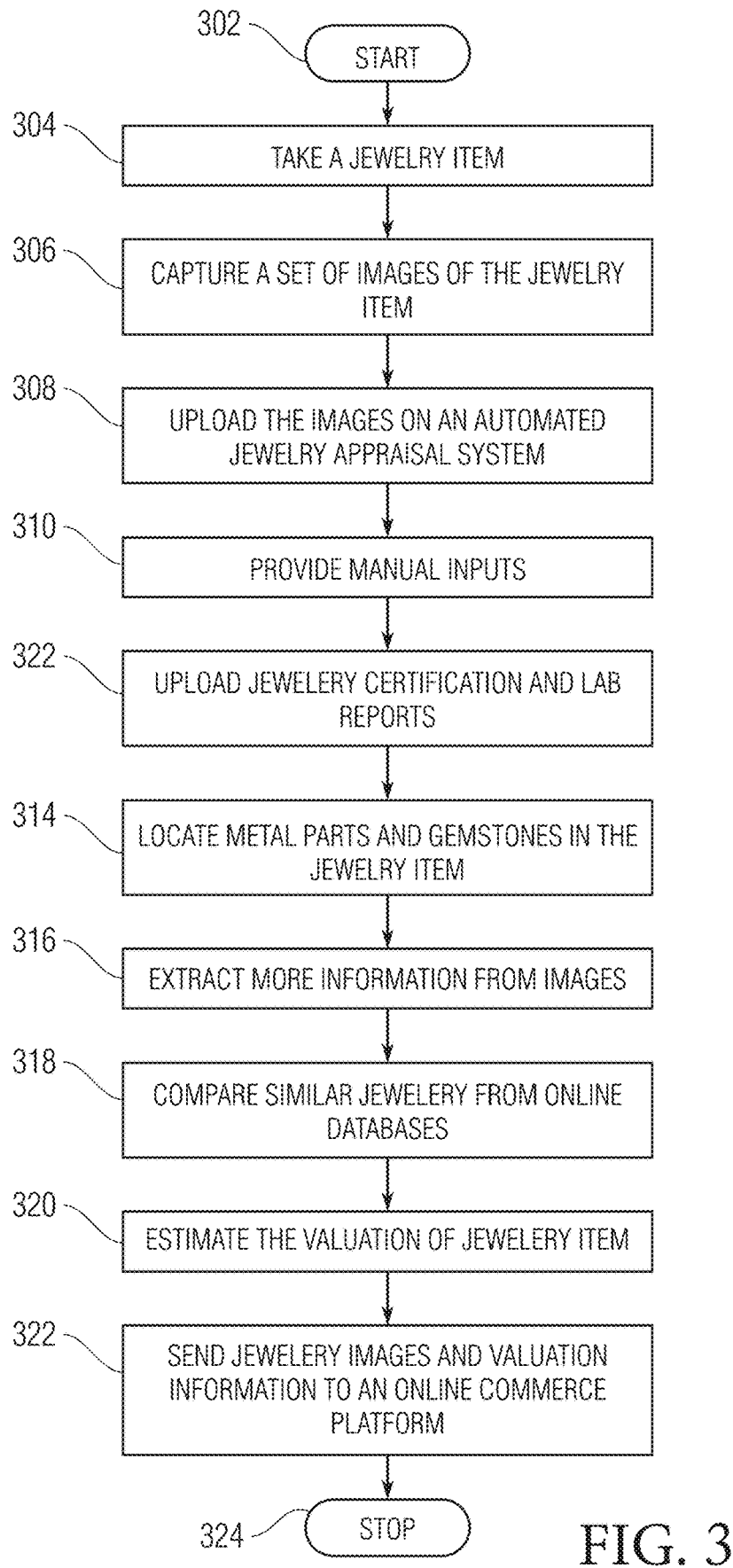
FIG. 3 illustrates a flowchart showing steps for online appraisal of the jewelry item.

FIG. 3 illustrates a flowchart showing steps for online appraisal of the jewelry item. The process starts at step 302 and a jewelry item is taken at step 304. A set of images of the jewelry item are captured using the image capturing device at step 306. The images are captured along with an object of standard dimensions, like a coin of standard size. This enables to calculate the exact size of the jewelry item and the angle of picture taken irrespective of the zoom view of the image. The set of images capture a complete view of the jewelry item. At step 308, the captured images are uploaded on an automated jewelry appraisal system. The automated jewelry appraisal system can be a software application running on a server computer, a client user computer, a mobile phone, a control system and a network router, switch or bridge. Alternatively, the software application can be running on a virtual computing system of a cloud environment. At step 310, the user can provide manual inputs in the automated jewelry appraisal system. For example, the user can input physical characteristics of the metal part and the gemstones like weight, volume, dimensions, carat, cut grade, color rating, etc. The user can also upload jewelry certification and lab reports at step 312 obtained from jewelry certification organizations like Gemological Institute of America, The International Gemological Institute, European, Gemological Laboratory, etc. At step 314, the software application automatically detects the metal parts and the gemstones in the jewelry item. The software application can use, for example, edge detection technology or any other methodology to create a point-to-point diagram or a line-wire diagram of the jewelry item. At step 316, the software application extract more information from the images, like size, weight, carat, color grade, clarity, cut proportions, polish, etc. The automated jewelry appraisal system access different online jewelry databases or websites, like zeales, Kitco, etc. to find jewelry items and gemstones with similar parameters, like color grade, prong styles, type of metal, design styles, etc. The data and valuation of these similar jewelry items is received and compared with the user jewelry item at step 318. The software application then estimate the valuation of the jewelry item at step 320 based on all the extracted information. At step 322, the gemstone or jewelry images and valuation is sent to an online commerce platform for displaying and selling the jewelry item. The process stops at step 324.

Figure 12A:
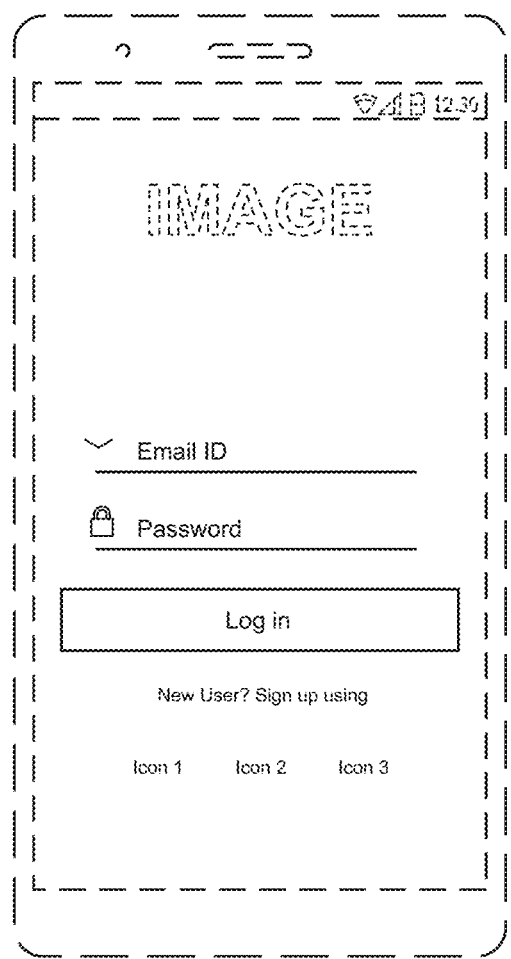
FIGS. 12a, 12b, 12c, 12d, 12e, 12f, 12g and 12h illustrates an exemplary mobile application of an online commerce platform for buying and selling the jewelry items.
Figure 12B:
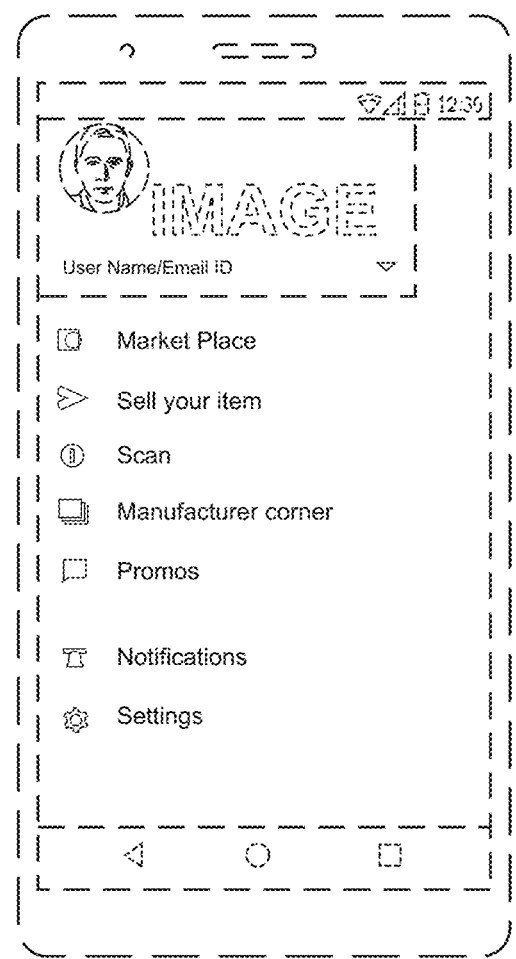
Figure 12C:
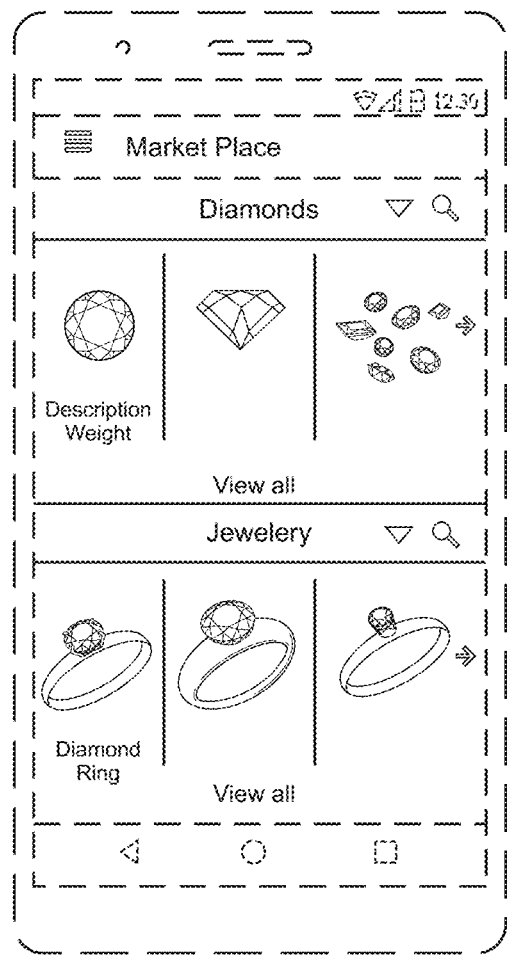
Figure 12D:
Figure 12E:
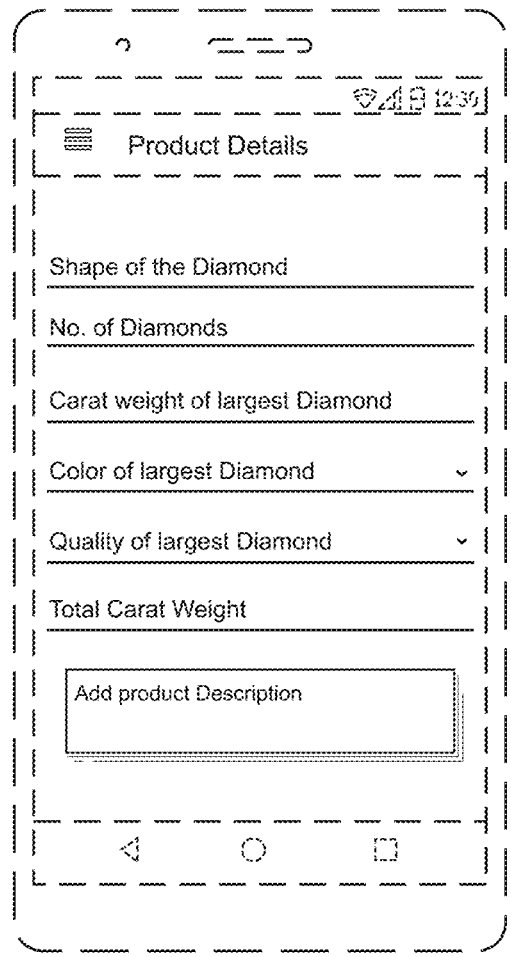
Figure 12F:
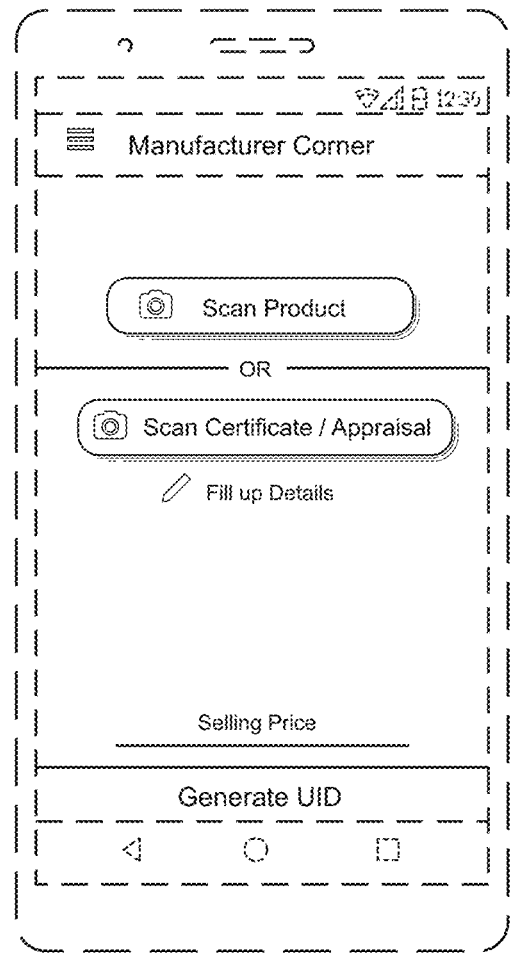
Figure 12G:
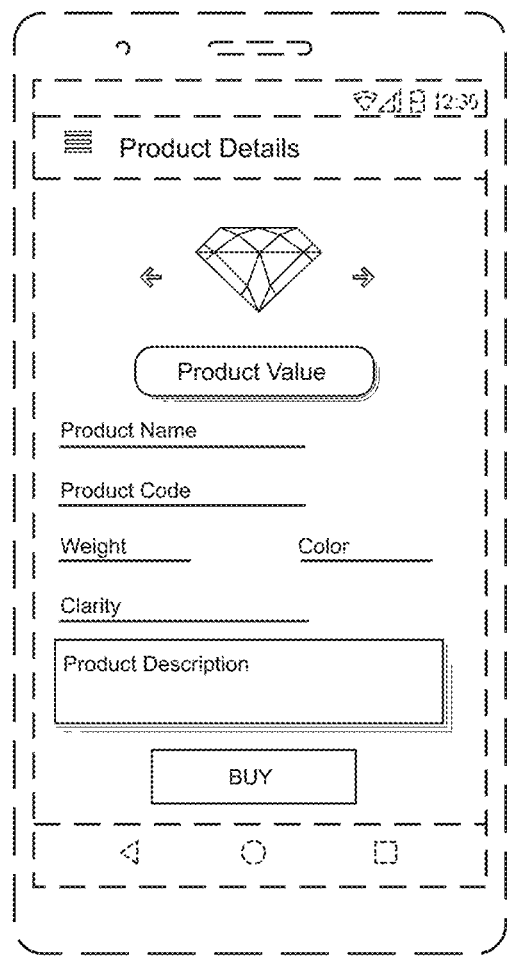
Figure 12H:
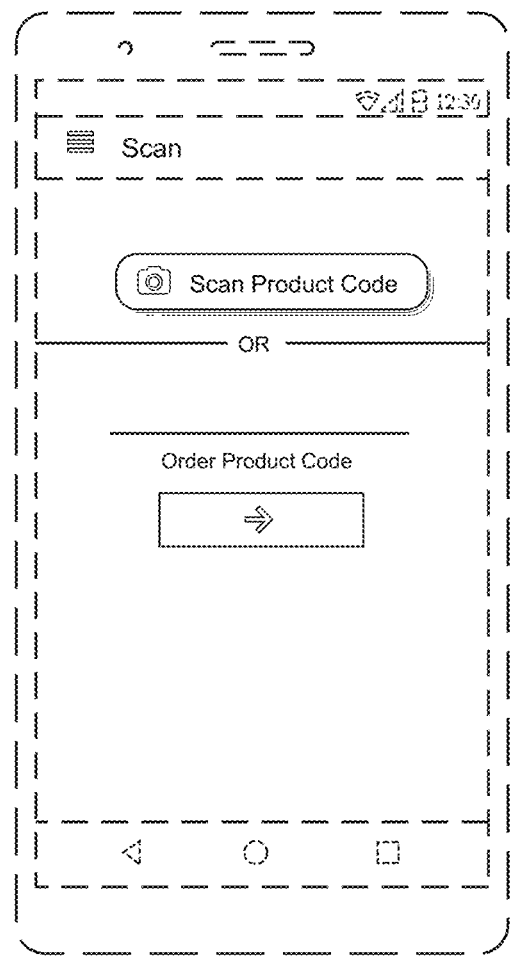

FIGS. 12a, 12b, 12c, 12d, 12e, 12f, 12g and 12h illustrates an exemplary mobile application of an online commerce platform for buying and selling jewelry items. A buyer or a seller of the jewelry item can create his/her profile in the mobile application and can login with the credentials as shown in FIG. 12a. The platform provides various functionalities to the buyer or seller like a 'marketplace' to buy gemstones and jewelry items available from different sellers, "sell your item" to sell its own gemstones and jewelry items, 'scan' to upload the images and lab certificates of the gemstones and jewelry items, etc. as shown in FIG. 12b. FIG. 12c shows a marketplace of the online commerce platform where the buyer or seller can view the details and pricing of the diamonds and jewelry items placed by different sellers on the platform. FIG. 12d shows the functionality of selling diamonds and jewelry items by clicking and uploading its images. The seller can also scan and upload certificates and appraisal reports provided by jewelry certification organizations like Gemological Institute of America, etc. The selling price of the item can also be inputted by the seller. FIG. 12e shows a user interface for inputting the product details for placing the product on the platform for selling. FIG. 12f shows a manufacturer corner for scanning and uploading certificates and appraisal reports by the manufacturer of the product. FIG. 12g shows the functionality of buying a product from the online commerce platform. On selecting an available product, the buyer can see all the product details and can buy the product. The buyer or seller can also scan or input a product code of the jewelry item or gemstone to find the product information such as price comparisons and user reviews of similar products available online on the platform as shown in FIG. 12h.

In accordance with these and other aspects of the disclosure, additional configurations and variations of the disclosed systems and methods for verification of a jewelry item are further described herein.

The foregoing has included discussion about a diamond's girdle, like its bearding, hills, valleys, small dents, etc.; however, such features are not used for performing gemstone verification.

Gemstone verification can involve gemstone characterization which includes operations for analyzing gemstone images and other measured data to detect and extract (e.g., measure or derive) a unique combination of gemstone features that are usable to identify and differentiate each unique gemstone. Gemstone characterization can also include generating a record of gemstone identification information, which can include one or more digital visual representations of gemstone features and/or other encoded information representing gemstone features. Such a record can be stored in a database record and is usable to perform further security verifications and operations. Gemstone verification can also include authenticity verification, which involves matching all or part of a query set of images and/or gemstone identification information against one or more previously registered records for the purposes of identifying or authenticating a gemstone and to determine whether any unauthorized alterations have been made to a gemstone. Gemstone verification can also include identifying any changes made to a gemstone over time and recording information concerning these changes in the database record for the gemstone to provide a complete and verified history of the gemstone and changes over time. In accordance with one or more embodiments, the system is further configured to utilize the unique combination of physical characteristics of a gemstone including any combination of the foregoing as a security factor to perform or authorize the gemstone wearer/owner to perform various secure operations and transactions.

Although the exemplary embodiments of the system 100 described herein are primarily discussed as performing gemstone verification based on physical characteristics of the girdle of a gemstone, the system can similarly perform verification based on extracted physical characteristics of other parts of the gemstone (e.g., its facet structure, inclusions and the like) as well as other parts of a jewelry item that the gemstone might be combined with including a metal part, gem holders that hold the gemstone to the metal part, such as prongs. Characterization of the girdle and its use in uniquely identifying a gemstone is a salient aspect of several embodiments in accordance with the present disclosure.

Figure 13A:
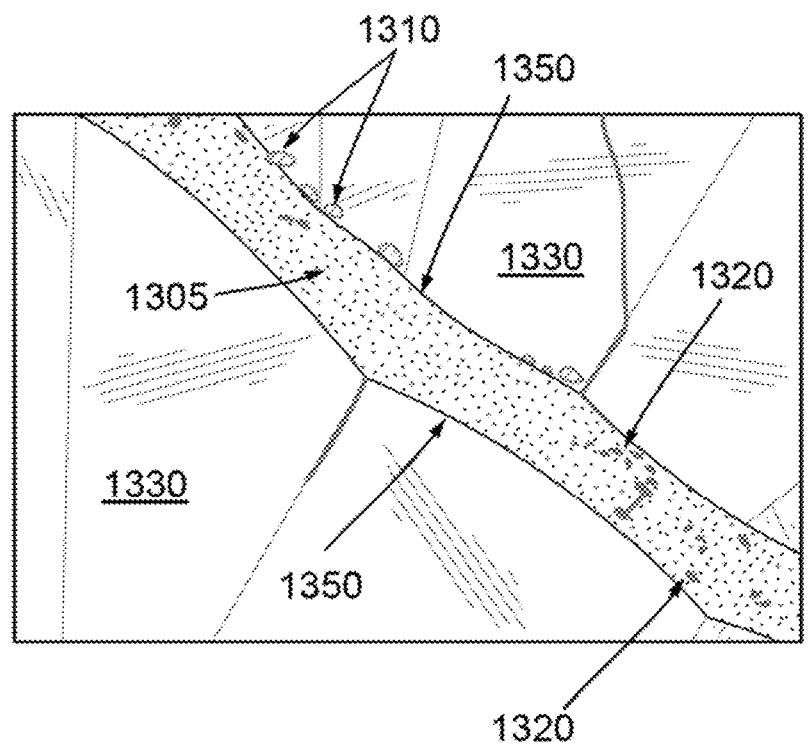
FIG. 13A is a photograph of part of a gem's girdle captured using a digital camera from a top-side perspective view in accordance with an embodiment.
Figure 13B:
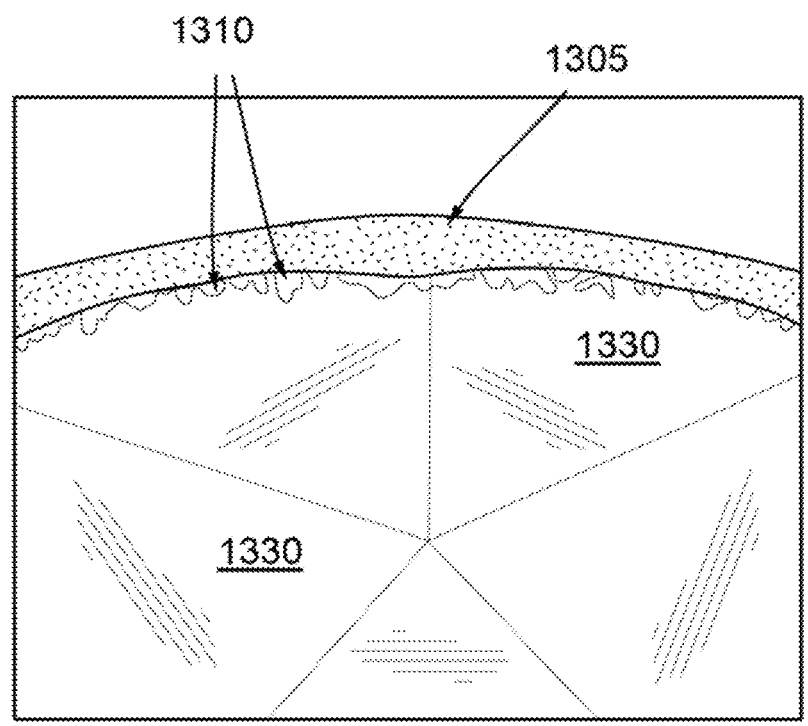
FIG. 13B is a photograph of part of a gem's girdle captured using a digital camera from a bottom-side perspective view in accordance with an embodiment.

In accordance with one or more embodiments, the system 100 is configured to image, analyze and measure physical characteristics of a gemstone, particularly its girdle, and utilize the measured features, differences in the gem girdle and minute detailed differences that occur along the length of the girdle to identify a gemstone. In this regard, the system 100 can be configured to use the image capturing device 102 to capture one or more images of a gemstone including its girdle, which typically extends peripherally about the side of the gemstone. Image(s) generally refers to a digital visual representation of the gemstone that can be captured using photo, video, laser-based tomography and other such three-dimensional scanning devices. Images can be captured under normal lighting and/or under special lighting conditions. For example, FIG. 13A is a photograph captured of part of a gem's girdle captured using a digital camera from a top-side perspective view (left image) and FIG. 13B is a photograph of the same gem's girdle from a bottom-side perspective view (right). The simplified gemstone images of FIGS. 13A and 13B, illustrate some exemplary features pertaining to the girdle 1305 of the gemstone including, the top and bottom edges 1350 where the girdle intersects with adjacent facets 1330, girdle bearding features 1310 that are typically near the edges of the girdle (e.g., either on the face of the girdle or adjacent facets 1330), natural or man-made imperfections 1320.

The images can be stored in a storage module 104 and provided to a processing unit 106, which, by executing one or more of the exemplary processing methods further described herein, is configured to extract information from the gemstone image, particularly, information concerning features (i.e., physical characteristics) of the girdle. The processing unit can also extract features of other parts of the gemstone in addition to the girdle, say, neighboring facets. As noted, optionally, additional features of the gemstone or jewelry item as a whole can be measured as well. Physical characteristics of a gemstone or jewelry item extracted from the images can also be generally referred to as herein feature data.

Figure 13C:
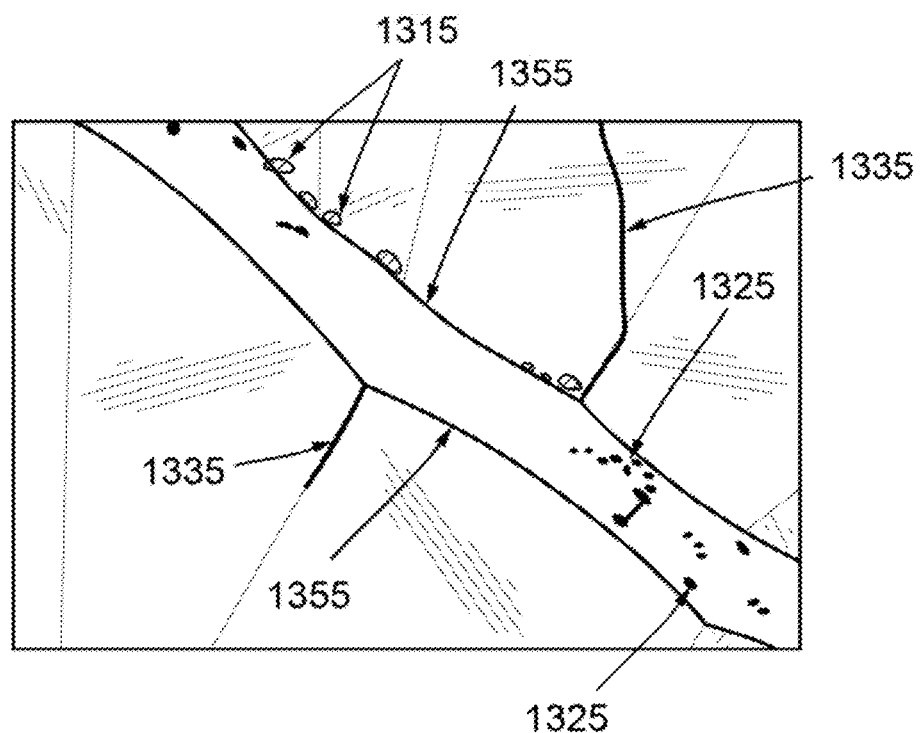
FIG. 13C is an exemplary line to line and point to point diagram of gemstone features including the girdle of the gemstone shown in FIG. 13A generated in accordance with an embodiment.
Figure 13D:
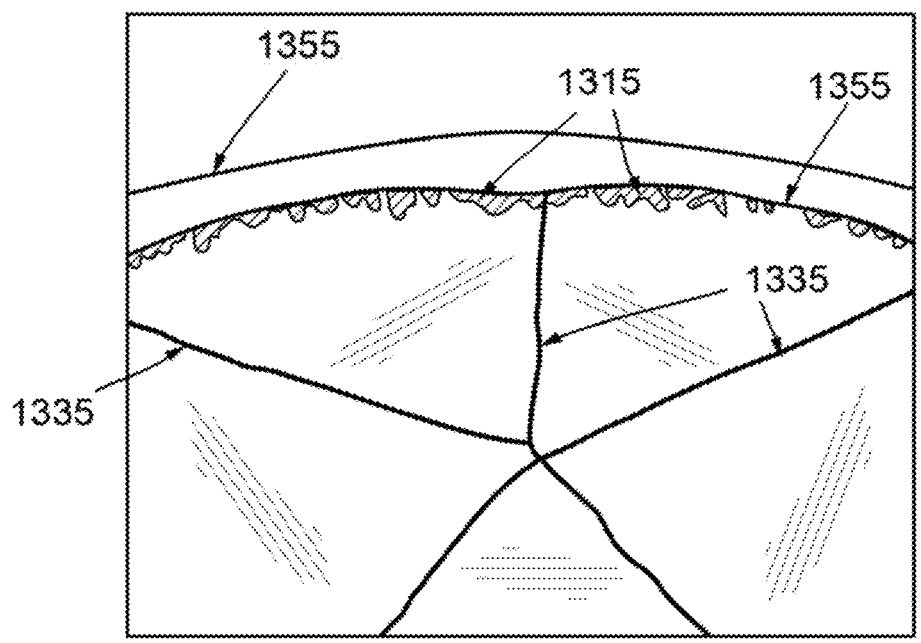
FIG. 13D is an exemplary line to line and point to point diagram of gemstone features including the girdle of the gemstone shown in FIG. 13B generated in accordance with an embodiment.

More specifically, the processing unit 106 is configured to extract unique set of characteristics of the gemstone using the girdle and facets of the gemstone that define the edges of the girdle. Additionally, the processing unit can be configured to create a line to line and point to point diagram or 3D image representation of a length of the girdle. FIG. 13C is an exemplary line to line and point to point diagram of the girdle shown in FIG. 13A wherein the line to line and point to point diagram is overlaid over the image of FIG. 13A. FIG. 13D is an exemplary line to line and point to point diagram of the girdle shown in FIG. 13B wherein the line to line and point to point diagram is overlaid over the image of FIG. 13B. In the exemplary diagrams illustrated in FIGS. 13C and 13D, girdle bearding features are shown as lines, points or cross-hatched areas 1315, girdle features such as natural or man-made imperfections are shown as solid lines or points 1325, edges of the facets are shown as solid lines 1335, and edges of the girdle are shown as solid lines 1355.

From the diagram, particularly, the lines that mark the top and bottom edges of the girdle, the processing unit 106 can be further configured to identify the valleys and peaks of the girdle and measure the distance between those features, e.g., the height of the girdle at one or more points. The processing unit can also be configured to extract (e.g., measure or quantify) other physical characteristics of the girdle based on the images and/or resulting diagram including, for example, the change in the girdle height along the length of the girdle, the wave-like pattern defined by one or more the girdle edges, the particular location, size and pattern of junctures between adjacent segments (e.g., facets) of the girdle. Additionally, the processor can be configured to measure girdle bearding features. In an embodiment, the processing unit can implement a trained Neural Network, which can be trained on training images to detect and classify features of the girdle including bearding, scratches, inclusions, and the like. Other image analysis and feature detection algorithms can be used to identify girdle features like bearding. The processing unit can be configured to measure various characteristics of individual features and their arrangement. For example, the processing unit can measure the length and shape and depth of a bearding feature or inclusion based on pixels. The processing unit can be configured to measure one or more features based on relative distances between features and position, extrapolate the shape of the feature and match with another. Features such as bearding can also be measured in actual size, shape and location values. Gemstone size measurements can be measured by the processor from the imagery or measured using other measurement devices and provided as an input to the processing unit. Exemplary characteristics of one or more of the girdle features that can be measured include, location/coordinates, length, width, shape, color, opacity, type of feature (e.g., bearding), relative position to other features near it, or on an opposite side of the gem to it, if any.

Furthermore, the system 100 can be configured to utilize these and other girdle characteristics as a unique identifier for a gemstone on the one hand and as a security factor on the other. Similarly, the unique combination of girdle features can be used to differentiate between and uniquely identify gems, and to evaluate whether there have been changes to a particular gemstone's features over time.

In addition to capturing the profile of a girdle, natural markings may preexist on a gem and cutting of a gem can also leave man-made or machine made etches in a gem. These features are sometimes only visible under certain lighting conditions, yet these markings define a unique identification fingerprint that is almost impossible to replicate. Accordingly, the processing unit 106 can be configured to record such features and use them for identification of a gem to a very high degree of accuracy and security. In particular, special lighting conditions can be generated by the system 100 using various types of light emitters during the imaging step. Special lighting can include, for example, a simple white light or laser light that is shined at a specific angle onto the gem and that causes these manmade or natural features to stand-out in the girdle images. Alternatively, special lighting can comprise a light pattern or a filtered light source that has a range of wavelengths filtered out or band-passed so as to differ from conventional white light. Additionally, filters can be provided between the light emitter and gemstone or between the gemstone and camera so as to reduce excess glare and screen out blinding light from the camera. Identification of a gemstone based on unique natural and man-made marking features on the girdle can avoid the need for costly equipment previously utilized for identifying a gem using laser inscriptions, which can be easily removed or erased.

The system 100 can be configured to implement the exemplary methods for capturing gemstone features, analysis and characterization using a basic digital image camera such as a smartphone camera. However, more detailed information can be revealed by using a high-definition camera, such as one that has a macro or high-powered zoom. As noted previously, the identifier markings identified through analysis of the gemstone image, among other information extracted or generated from the raw or processed images and diagrams, can be stored in a database, for instance, external storage 112 and/or the storage module 104 shown in FIG. 1.

Preferably the system is configured to obtain images including identifier markings for the entire girdle. As used in this disclosure, the system is or can be configured, in each case, by providing code from a memory which is executed in a processor to perform the functions described herein. Thus, when the system is configured to obtain images including identifier markings for the entire girdle, the processor is configured by code for that purpose.

Identifier markings can also be obtained for all facets of the gem. Additionally, the system can be configured to break up the images into smaller images. For instance images can be broken up based on various features including, for example, at each juncture of the girdle segments, the meeting of facets to the girdle or meeting of facet to facet among other features like inclusions or open surfaces in a gem. The processor can execute code to identify the junctures and divide the images in memory on that basis for analysis or for storage. The raw and processed images, and the generated visual representations of the gemstone, can be stored as a whole 360 degree point to point and line to line diagram. However, even a small juncture or part of a previously stored image of a girdle and/or faceting can be utilized for gemstone identification. For instance, a small juncture of a known/stored gemstone image can be checked against a current query image and, if a match is found, the gem is identified. The system can also be configured to identify a match between gemstones by overlapping girdle images or "marker images," which refers to the point to point and/or line to line diagrams representing the unique combination of features used to differentiate one gem girdle from another.

Further, in accordance with one or more of the embodiments discussed above, if the gem is set in a setting (i.e., "pronged"), an image of the prong and the placement of the prongs and the girdle can also be captured. The system can be configured to use such additional information as an even more specific test to determine whether a gem has moved, been replaced or otherwise altered from its original setting using point to point and line to line comparison and the prongs as a point of identification.

Figure 15:
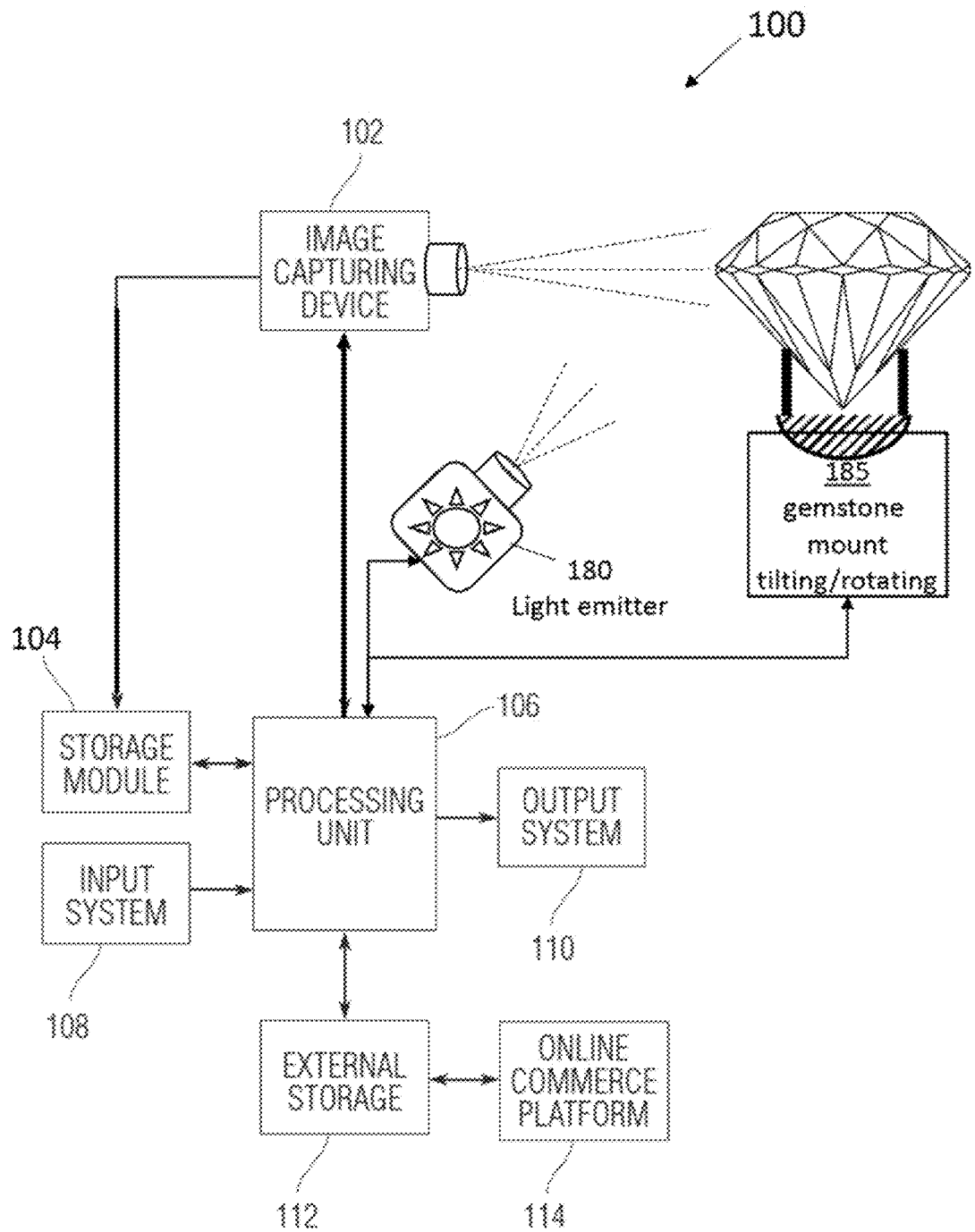
FIG. 15 is a block diagram of the exemplary system shown in FIG. 1 including a light emitter and rotating/tilting gemstone mount in accordance with an embodiment.

In accordance with one or more embodiments, the system 100 can be configured to capture one image or 360 degree video of the gemstone under lighting by a light emitter 180 (as shown in FIG. 15) on and another with it off. The system 100, particularly the processing unit 106, can be further configured to perform a comparison between the lighting on image and lighting off image to further identify any hidden girdle features that present as differences between lit and unlit girdle image. The images can be compared in either parts or the whole, as needed. Additionally, during gemstone identification, a particular portion of a reference image or diagram can be located in a database and compared to the corresponding portion of the query image or line to line or point to point diagram. For example and without limitation, image comparison can be performed using pixel comparison methodologies in which an array of pixels is used for the actual comparison of the query image and the reference image it is being compared to. In addition or alternatively, point to point and line to line diagrams can be generated for respective image segments and compared.

By way of further example, a Neural Network can be trained on the before images of a gemstone to extrapolate pertinent feature data and save it to the database record. The new images of a gemstone are similarly analyzed to gather the feature data and then perform an image comparison against the previously obtained/trained dataset. Matching can be performed incrementally, for instance, if a match of a point-of-interest is found, the processor can be configured to compare more such points from the images.

In one or more embodiments, the processing unit can be configured to implement image comparison as a function of which angle the query images have been taken from and perform matching against recorded images captured from similar angles.

Additionally, the gemstone image comparison can be performed using point to point (P2P) and line to line (L2L) and diagram to diagram (D2D) comparison methods. The P2P L2L and D2D can be used individually or together or in various combinations, depending on what information is of interest and from what angle/s the images were taken.

The collection of feature data points that are usable as a gemstone identifier can be stored in the database record in the form of a diagram that can be physically reproduced for a user to view. In addition, or alternatively, the feature data set can be encoded in the Neural Network or computer program (e.g., in a numerical form, as a mathematical formula or other such machine readable encoded representation). The processing unit can be configured to generate the identifier by executing the steps of: finding and segmenting parts of the jewelry item and tagging them. Then the processor can identify points of interest (POI), key POIs being the gem, girdle, inclusions, facet lines, bearding on girdle or other dents and nicks, culet center and facets leading to it, inscription on gem etc.

As noted, additional identifying and unique features can be found in accordance with one or more of the embodiments. For the jewelry item, for example, the feature data can include the angle of prongs, a location where the prongs touch the gem and the girdle touches the prongs, color of the metal, scratches and other unique features, the stamping on the metal and the like.

In one or more embodiments, the processing unit can be configured to generate the P2P and L2L diagrams in various ways. For instance, if two POI points are found, a descriptor line can be drawn connecting them in multiple ways including: 1) a straight line; 2) a line going through an object within the image; 3) an inverted "V" shaped line or line of some other shape; 4) an imaginary line or real line linked to that descriptor line and having a fixed number of pixels or distance from that connection. Subsequently, such information concerning the POIs can be used to train the matching algorithm to use the same POIs and distances for triangulation and processing of subsequent images. For instance, when a new set of one or more gemstone images (e.g., video, sonar, laser, any sort of image type) for matching against a database record, the processing unit can be configured to identify the same POIs and, using the same pixel distance or line lengths, determine how and where the same points match between both image sets. Since the query image and reference image might not be taken at the same angle and distance relative to the gemstone, the exemplary line to line and point to point and diagram of the POIs (e.g., edges) can provide enough identifier points for the processing unit to match, reject or determine a partial match to a prescribed degree of confidence.

In one or more embodiments, the processing unit can be configured to find POIs on various elements of the jewelry item, align those POIs in a prescribed way by rotating scaling or otherwise adjusting the imagery (and if necessary capture additional images at one or more positions or angles), and measure the POI to POI lines/distances, sizes etc.

As previously noted, in one or more embodiments, the processing unit can be configured to analyze a gemstone image using a reference point or object, such as a object in the foreground or background of the image (e.g., a coin in the image used as a size reference, a circle having a known size provided on the platform of the gemstone mount, a marking on a gemstone holder or imaging station) to obtain bearings, perform accurate alignment, scaling and size measurements.

Figure 14A:
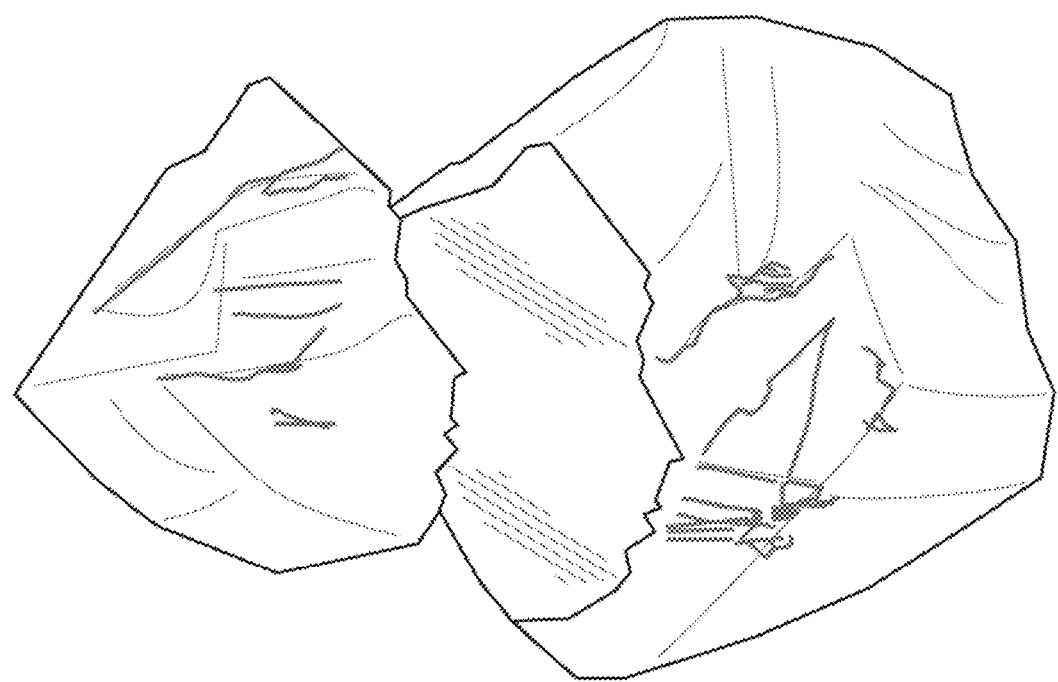
FIG. 14A is an image of a rough diamond captured after being split into two halves in accordance with an embodiment.
Figure 14B:
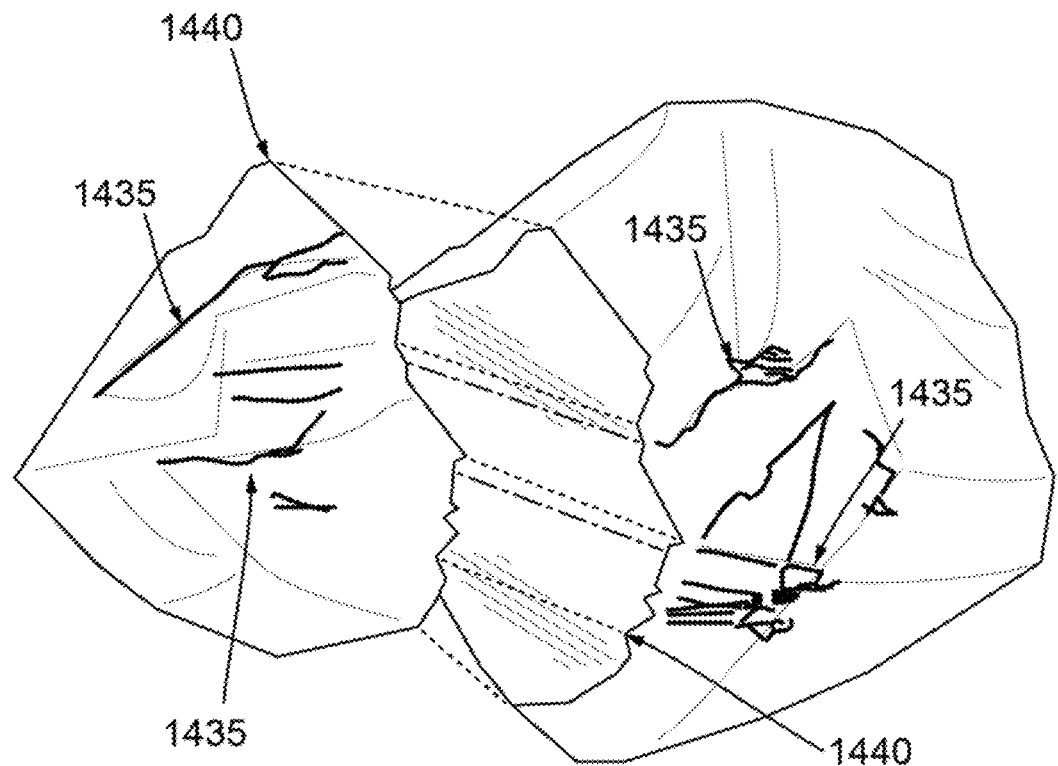
FIG. 14B is a point to point and line to line diagram of detected features of the outer-surface and the edges of two halves of a split stone overlaid on the image of FIG. 14A in accordance with an embodiment.

In accordance with one or more embodiments, other features of a diamond can be imaged and analyzed and used to generate a point to point and line to line diagram at various stages in the manufacturing process. The particular combination of parts of the gemstone that are imaged and analyzed throughout the lifecycle of a gemstone can vary depending on which stage a gemstone is at between discovery at the mine through the retail and ownership stages. For example, FIG. 14A is an image of a rough diamond captured after being split into two portions. FIG. 14B includes a point to point and line to line diagram of detected features of the outer-surface and the edges of the two portions overlaid on the image of FIG. 14A. As shown in the exemplary diagram of FIG. 14B, edges of the diamond are shown as solid bold lines 1435, and dashed lines and dash-dot-dash lines identify the correspondence of certain surface edges/points 1440 on one half of the rough diamond to surface edges/points 1440 on the other half of the rough diamond after splitting.

Additional details concerning exemplary methodologies used by the system 100 for imaging the girdle, identifying unique features, using those features to identify and verify a jewelry item are further described herein.

As noted, the system 100 can be configured to image and analyze features of a gemstone including girdle features using a suitable image capture device 102 having, for example, video, image, and/or laser-based imaging technologies. For instance, the image capturing device can include a digital video camera that has high-resolution imaging capabilities. If, however, a low-resolution image capture device is used, the system, particularly the processing unit 106, can implement image processing algorithms to analyze the image, isolate features and otherwise update the images to more suitable resolution for further analysis.

In one or more embodiments, the image capture device can also be configured to capture images under moving or vibration conditions, such as those conditions that can occur while a gemstone is being cut with a cutting wheel. In such a configuration, the image capture device is preferably able to auto focus to improve imaging quality while the gemstone is moving or vibrating. In one or more configurations of the system, one or more such image capture devices can be used, depending on the type of process being implemented. For instance, different configurations of the system 100 can be provided at the mine stage (e.g., for imaging rough diamonds) or manufacturing stage (e.g., for imaging and analyzing gems during one or more of the cutting, cleaving, polishing, bruiting, rounding and/or polishing the girdle stages etc.). As such, the imaging device needed may vary based on the process being performed at a given stage. However, preferably the imaging device captures imagery that is very focused and high resolution and in view of any required lighting features.

In one or more embodiments, the system 100 can be configured to controllably move the gemstone during imaging, for instance, using a computer-controlled gemstone support table. It can be preferable to image the girdle while it is held at a tilted angle relative to the image capturing device, or while continuously tilting the girdle through a range of angles between a top perspective and bottom perspective angle so that the light bounces off the girdle and minute details of the girdle features including inclusions, cutting patterns, girdle facets, bearding etc. are more visible. Similarly, the system can be configured to make these and other features such as facet lines and natural, cutting or wear and tear created differences and identifier points more visible and brought forth through controlling lighting angle and/or tilting motion and imaging angle.

For example, exemplary steps for imaging the gemstone while rotating and/or tilting the gemstone performed using the system 100 can include: positioning the gemstone at a starting position in which the optical axis is pointed directly at the girdle and perpendicular to the gemstone's vertical axis, which extends from the bottom of the gemstone to the top through the center of the gemstone; controllably rotating the gemstone 360 degrees about its vertical axis between a start/stop location; and capturing imagery continuously during rotation or at a prescribed number of rotational positions. Additionally, at one or more of a plurality of rotational positions, the system can be configured to capture one or more images while a) controllably tilting the gemstone such that the vertical axis is at least partially angled away from the imaging device (e.g., providing a bottom perspective view of the girdle at a given rotational position); b) controllably tilting the gemstone such that is vertical axis is angled at least partially toward the imaging device (e.g., providing a top perspective view of the girdle). Images can also be captured for one or more angles in the range of angles between the tilted-away and tilted toward positions. FIG. 15 is a block diagram of the exemplary system 100 shown in FIG. 1 further illustrating a light emitter 180 and rotating/tilting gemstone mount 185 that are in communication with the processing unit 106 and controllable by the processing unit in accordance with one or more embodiments.

While it can be preferable to automatically control rotation, tilt, imaging angle, and lighting angle automatically by adjusting the position of one or more of the camera, the lighting device and the gemstone mount, more basic configurations of the system 100 can be configured to perform the imaging, girdle-based analysis and identification operations without such computer-controlled enhancements.

As noted, images of a gemstone can be captured at various stages during the mining, manufacturing, marketing/retail and ownership stages. In one or more embodiments, changes made to a girdle during manufacturing (or other gemstone and jewelry item part for that matter), can be captured in a before and after image. Additionally, a before and after image processing method can be implemented by the processing unit 106 which includes at least one processor and a memory to store code to configure the processor, and, hence, the system described herein, to create a new "spliced image" that includes the changed portion(s) of a gemstone part (e.g., girdle, facet, etc.). The "spliced image" can be created using conventional photo or video editing and splicing and gluing operations. The "spliced image" can be created in a virtual way such as building a 3D imaging model of the gemstone part from the before image and then slicing and gluing to that model, a virtual representation of the part that is generated from the after image showing the modified part. Additionally, the processing unit can be configured to implement a combination of these processes to show an image of the changed part on the virtual image or with the virtual spliced part on a real image etc.

In one or more embodiments, the image capturing device 102 can be placed in the gemstone processing station (e.g., the cutting or gemstone mount station) or mounted externally, depending on the requirements of the process performed at a given processing station. The system 100 can be configured to automatically start and stop the imaging process in response to a pressure-release, manual, automatic, or some other method of triggering. The image capturing device 102 provides the images to the processing unit 106 and/or stores the images in a database of the system 100 at which point the processing unit 106 can perform the various processes to capture details of the gem (e.g., the weight or where it's from) and identify physical features.

As noted above, the system 100, particularly the processing unit 106, is configured to identify and measure various features of the gemstone girdle. These features can include, girdle bearding, the wave-like line formed by the top and bottom edges of the girdle, inclusions and other markings. The system is also configured to measure and identify the girdle itself, the lines corresponding to the top and bottom edges of the girdle and the wave-like pattern of peaks and valleys the edges define, and the distance between the two edges. The system is also configured to measure the dimensions and arrangement of girdle segments (e.g., facets), the spacing between girdle segments and the size, spacing and pattern that the junctures (e.g., spaced-apart vertical edges between segments) occur along the girdle length. Detecting edges top/bottom and junctures can be performed using an edge detection image processing methodology. Further the system is configured to identify and measure the small features or and differences created by the cutting process or naturally. Further the system 100 is configured to create the point to point and line to line diagrams representing these and other girdle features.

The processing unit 106 can be configured to generate a L2L or P2P diagram using a neural network or algorithm programmed to draw lines joining identified points of interest. A line can be a straight line or a bent line, circles or concentric circle lines, or any other prescribed line shape. Lines and points can be represented visually in a diagram. Lines and points can similarly be mathematically represented (e.g., as a formula, values for location and length and direction, a vector, etc.).

The diagram generated for a gemstone is preferably a combination L2L and P2P diagram in which gemstone features are represented by a combination of lines and points. In some instances, a line (e.g., an edge of the girdle or facet or an elongate feature) might not be identifiable or fully identifiable in an image or might be cut off in the image or due to the angle at which the image was captured. Accordingly, points of interest are identified and used in conjunction with the lines to provide a L2L and P2P diagram. However, it should be understood that diagrams of points and lines can be separately provided. The line diagram also can also be used to help isolate whole or parts of the jewelry item or gem.

The processing unit can be configured to generate the L2L and P2P diagram by detecting the various features of a gemstone and representing detected edges of a gemstone and other elongate features as lines and representing smaller point-like features as points. It should be understood that the ends of lines can similarly define points in the diagram. As noted, the L2L and P2P diagram can also include additional lines which the processing unit draws between lines or points-of-interest.

In some embodiments, the processing unit can be configured to generate a diagram of a girdle by "drawing" one or more lines along the girdle or parallel to the girdle. In one example, three lines can be drawn, one along the top edge, one along the bottom edge and one in the middle of the girdle. Additionally, the processor can be configured to draw line markers at the location of inclusions, natural or man-made markings on the girdle, girdle bearding and other such features.

In accordance with one or more embodiments, the system 100 is configured to use lighting and tilting and other means to capture more information about the physical features of a gemstone than just taking a video or photo. Moreover, the system can comprise various combinations of devices, e.g., tilting, lighting and imaging devices that can be tailored to the type of process being done.

In accordance with one or more embodiments, the exemplary methods for analyzing a gemstone include specific processes for processing the images. These image processing operations can make it easier to match or identify a gemstone even if the image is only a small section of the whole gem like the girdle or even a smaller section (e.g., small section or sections of a girdle). Preferably, one or more visible sections of a girdle may need to be used to increase accuracy, especially if a gem is set in a holder of sorts during the image capture process.

In accordance with one or more embodiments, the processing unit 106, can be configured to implement methods for analyzing a gemstone that include operations for breaking a gemstone down into smaller identifiable parts, and each such part can be searched for in the database.

Additionally, in the situation where the gemstone is known and analysis is being performed for the sake of change monitoring, this can cause the processing unit 106 to splice in the information relevant to the new change.

As noted, the processing unit 106 can be configured to generate a diagram of a whole jewelry item, respective parts of a jewelry item (e.g., the gemstone and opposed to the metal part) and/or sub-parts/segments (e.g., a girdle or girdle segment diagram). Accordingly, the processing unit can be configured to segment an image of a jewelry item comprising a gemstone and a metal part (e.g., a ring and prongs that the gemstone is set in) into parts. For instance, the processing unit 106 is configured to segment the image into a gemstone, and metal part, and then segment the metal part into prongs and shank and inclusions and metal scratches etc. Similarly, the portion of the image(s) classified as the gemstone and segmented, can be analyzed to further classify and segment the gemstone image into sub-parts/segments such as the girdle, girdle segments and other gem parts. The processing device thus is configured to, using one or more classifiers and segmentation algorithms, classify the various parts of a gem from the images, separate out the respective parts in the images. The classifiers and segmentation algorithms can assist the training of the neural network used to identify distinguishing features, characterize a gemstone (or other part of the jewelry item) and assist the matching operations performed by the neural network.

In accordance with one or more embodiments, if the full image of a complete gemstone is not available, the processor is configured to perform analysis and matching using a partial image. In particular, the processing unit executing a classification algorithm, can be configured to identify a particular part of the gemstone depicted in the image, say, the girdle or a ¼ girdle segment. Accordingly, the feature data for the girdle can be extracted in accordance with the exemplary methods described herein. Additionally, in accordance with the exemplary methods described herein, the feature data from the query image can be compared matched against one or more references in the database, wherein the feature data is only matched against the corresponding girdle feature data for the respective references.

As can be appreciated, there are various technical challenges to overcome in order to image and analyze a gemstone girdle. For example, it is not easy to find the small differences in the facets without lighting and tilting the gem or the use of a high-powered camera device. Also focusing on the girdle point and finding and splicing and matching or replacing captured images exactly where any changes have occurred or where any part of the gem is hidden.

Additionally, because finding size and distance or depth perception from a 2D image can be challenging, the system 100 can be configured to generate a 3D model from images captured at multiple angles. In addition or alternatively, the system can be configured to gauge depth perception based on a reference to a known object, like a disc or something that reflects off the metal or gem thereby allowing calculations of depth and angles. Accordingly, the system can be configured to automatically identify and analyze the known object's reflections or shadows or degree of refraction and determines the needed information relating to depth and angle.

In accordance with one or more embodiments, the system 100 can have various configurations depending on the application and requisite detail. In one configuration the system can utilize conventional phone cameras and optical magnifying lenses and other instruments like a gem holder or tweezer to tilt and take images. In addition or alternatively, additional light devices and laser pointers could be used as well. Alternatively a box-like mechanical gemstone mount or instrument could be utilized. As noted above, in a more complex arrangement the system can comprise a dedicated imaging station including one or more high-resolution imaging devices, a computer-controlled gem holder, lighting equipment and the like.

To recap, the exemplary systems and methods for verification of a gemstone include steps for mapping out the features of a girdle, alone or in combination with other gemstone parts.

As can be appreciated, the exemplary system 100 identifies distinguishing features of a gem (and optionally the jewelry item it is set in) and encodes those distinguishing features in one or more digital representations of the gemstone that can be stored in a database record for the gemstone. For instance, the digital representation of the gem can be a diagram representing the distinguishing features in the form of point to point and line to line diagram. Additionally, the image(s) can be stored in raw and/or processed form in the database record. Furthermore, information input into the system or derived from the imagery and analysis of the gemstone can be stored to the database record to facilitate subsequent searching, matching and other such operations. That additional information can include, for example, other physical characteristics of the gem or jewelry item, the owner of the gem and the like. By way of further example, the additional information can also include codes representing the characteristics of distinguishing features of the gem.

In accordance with one or more embodiments, the system 100 can be configured to utilize virtual reality or augmented reality photo/video devices to perform the imaging, analysis and display of information to a wearer or user/controller of the augmented reality device. The image processing and analysis can be performed inside the AR machine itself, using a separate computing device in communication over wifi or Ethernet like a mobile phone. In addition or alternatively, images can be sent to another computing device to perform the image processing and analysis. More specifically, the system can be configured to use an augmented reality device having a camera to capture real time images of jewelry items and make real time calculations and predictions. The augmentation allows the user to move around, either the jewelry item or the image taking device. Based on the real-time analysis of the images, the system 100 can be configured to guide the user, via the AR device display or audio output, where next to move the device or the item and verify whether the movement enabled the system to detect the necessary data. For instance, the user can be instructed to move the imaging device over a gemstone set in a gold set ring being held by 4 prongs (e.g., using audio or visual instructions to capture a top view then side view etc.). As the system receives and identifies the information from the images necessary to identify the item, like the gem top, side, the girdle, prongs, and any small inclusions, scratches or the physical tag that may have a bar code or some sort of identifier, the system can in real time predictively identify the item (e.g., associate it with an existing inventory stock item/number) and predict real-time pricing and other details. The information gathered or generated by the system, such as the line to line and point to point diagrams, prong setting, girdle and other features used to identify or valuate the item can be output to the user, as well as pricing and identification information. This way, the system including the augmented reality input/output interface provided can be used to provide the user with a tag-less ID of the item and virtual price tag. While the foregoing embodiment of the system is configured to work with a dedicated AR device such as AR glasses with imaging and display functionality, a smartphone, tablet or other such mobile computing device can similarly be used with the system to provide an input and output interface with AR functionality.

In accordance with one or more embodiments, the system can be configured to perform imaging process multiple times and at varying angles for better results. Features such as gemstone weights, colors, place, time of first instance, can be manually or automatically determined by the system using connected devices such as scales or automatic color detection systems. Then a point to point and line to line diagram and 3D models can be created to map the features.

In accordance with one or more embodiments, the system can be configured to rotate the gemstone during imaging based on the faceting. Furthermore, each facet can be separately illuminated and the facet junctions can be used as markers to find the junctions and rotate accordingly. The system can be configured to adjust the light to intersect each respective section by increasing or decreased light widths so as to match the size of the respective junction.

In accordance with these and other aspects of the disclosure, additional configurations and variations of the disclosed systems and methods are further described herein. According to a further embodiment, features and functions of the systems and methods for performing gemstone analysis and verification are adaptable to provide a tool for processing of multiple loose gemstones using enhanced computer vision techniques (i.e., image-based analysis techniques).

Figure 16:
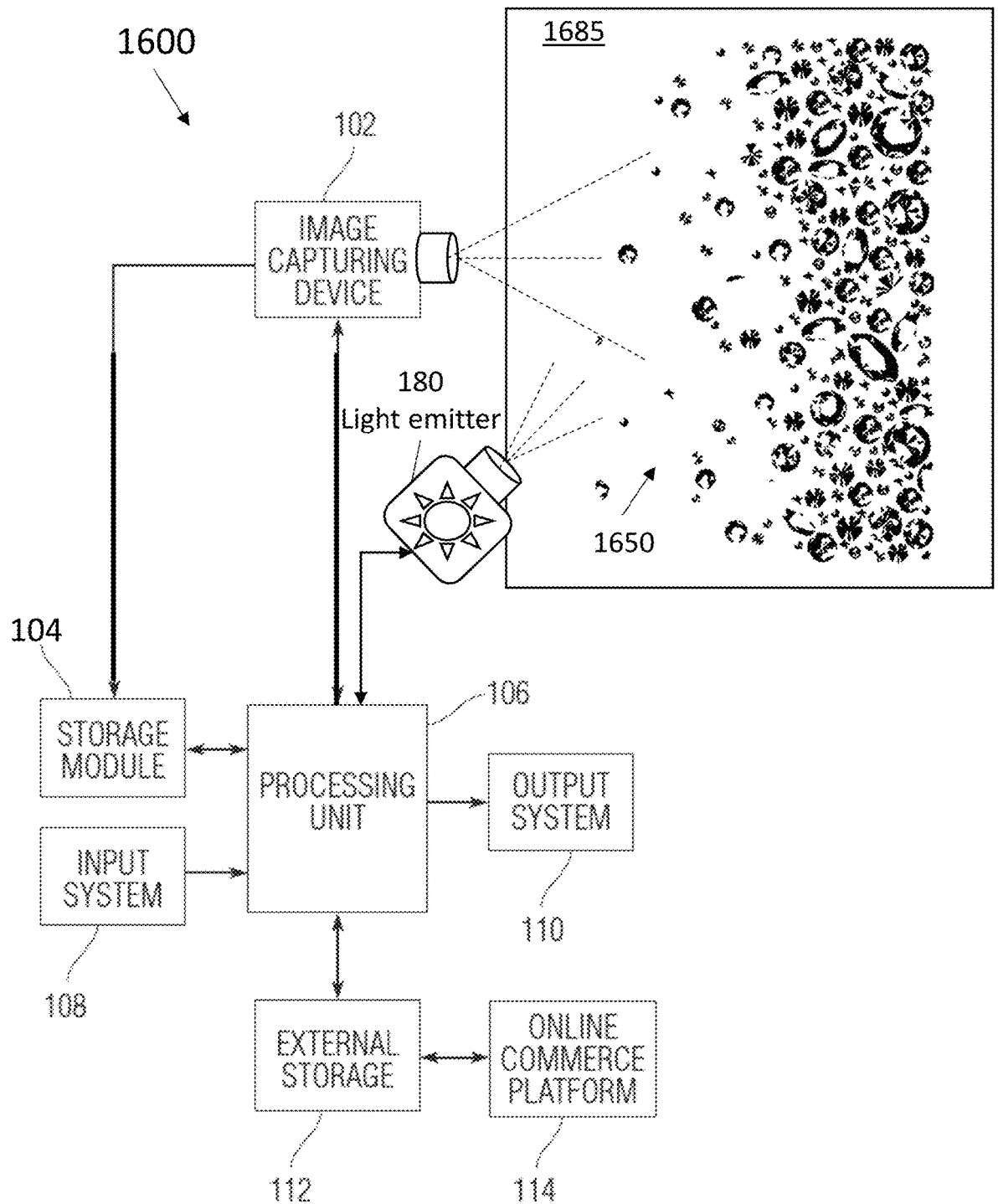
FIG. 16 is a block diagram of an exemplary system for processing multiple loose gemstones using image-based analysis techniques in accordance with an embodiment.

FIG. 16 illustrates an exemplary system 1600 for processing multiple loose gemstones using image-based analysis techniques. The system 1600 comprises the same basic components as system 100 including, an image capturing device 102, a memory/storage module 104, a processing unit 106, input system 108 and output system 110. Whereas the system 100 has been shown and described as being configured to image and analyze one or perhaps a few gemstones at a time, the exemplary system is configured for performing image-based analysis of relatively large quantities of gemstones, say, for example and without limitation, on the order of tens or hundreds of gemstones.

By way of overview and introduction, as further described herein, the exemplary system 1600 for processing multiple loose gemstones can be configured to capture one or more images of a relatively large quantity of loose gemstones (e.g., 150 gemstones). As shown in FIG. 16, the gemstones 1650 are provided on a flat surface 1685 of a workspace (the "worksurface" 1685) where the gemstones are being processed. The system is further configured to analyze the one or more images in order to facilitate one or more of a variety of manual and/or automated gemstone processing operations. The gemstone processing operations can include, for example and without limitation, counting the gemstones, separating out specific quantities of gemstones, classifying the gemstones based on one or more of a variety of physical characteristics, sorting the gemstones, selecting gemstones having specific characteristics, and the like. Although the gemstones are placed on a worksurface, such as a platform, it should be understood that the gemstones can similarly be imaged, analyzed and processed while being held by a human hand or other suitable gem holding device.

Figure 17:
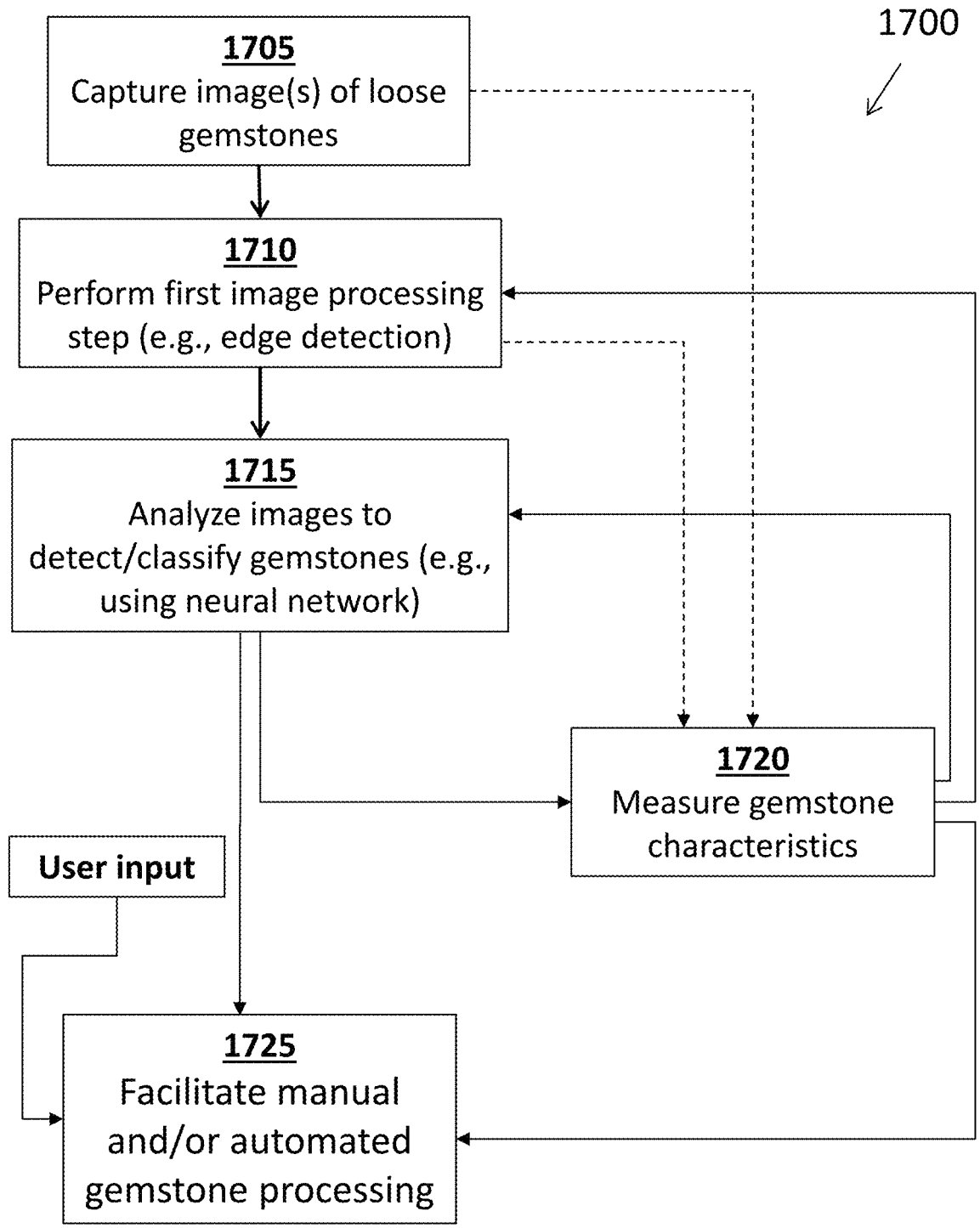
FIG. 17 is a process flow diagram of an exemplary method for processing multiple loose gemstones using image-based analysis techniques in accordance with an embodiment.

FIG. 17 is a flow chart of an example method 1700 for processing multiple loose gemstones according to an embodiment of the present disclosure. The method 1700 and other methods disclosed herein can be implemented using the system 1600 of FIG. 16. However, it should be understood that portions of this and other methods disclosed herein can be performed on or using a suitable custom or preprogrammed logic device, circuit, or processor, such as a programmable logic circuit (PLC), computer, software, or other circuit (e.g., ASIC, FPGA) configured by code or logic to carry out their assigned task. The device, circuit, or processor can be, for example, a dedicated or shared hardware device (such as a laptop, a workstation, a tablet, a smartphone, part of a server, or a dedicated hardware circuit, as in an FPGA or ASIC, or the like), or computer server, or a portion of a server or computer system. The device, circuit, or processor can include a non-transitory computer readable medium (CRM, such as read-only memory (ROM), flash drive, or disk drive) storing instructions that, when executed on one or more processors, cause portions of the method 1700 (or other disclosed methods) to be carried out. It should be noted that in other embodiments, the order of the operations can be varied, and that some of the operations can be omitted. The electronics can also include a user interface equipped with a touch screen (e.g., a touch screen of the image capturing and gem evaluation device, such as a touch screen of a mobile phone) to permit computer interaction.

In the example method 1700, processing begins with capturing 1705 one or more images of the gemstones using an image capturing device. In some embodiments, this can be performed using the image capturing component 102 taking a top-plan view photo of the worksurface 1685 having the plurality of gemstones 1650 resting thereon. In some embodiments, the capturing includes capturing two or more images of the gemstones. The two or more images can be taken from one or multiple angles, such as from directly above the worksurface, from a top-side perspective of the worksurface, and/or from any other suitable vantage point. The digital data in the two or more images are stitchable together for analysis according to the techniques described herein. In another example, data is extracted and analyzed from the images separately, or from a three-dimensional composite image created from the separate images.

At step 1710, a first image processing step is performed by the processing unit 106 on the one or more images. In some embodiments, step 1710 can include performing edge detection on the one or more images. The edge detection algorithm detects edges of the gemstones in the image and possibly edges of other objects depicted in the image. Step 1710 can further include generating and storing information concerning the detected edges such as a diagram representation of the detected edges, for example, a point-to-point and line-to-line diagram. In some embodiments, step 1710 can include image pre-processing steps that facilitate operation of subsequent gemstone detection steps.

At step 1715, a second image processing step is performed by the processing unit 106 to detect individual gemstones within the one or more images. In some embodiments, the second image processing step can include processing the one or more images using a neural network trained to detect gemstones within an image. In particular, the neural network can be trained to detect objects within an image that are gemstones, classify each as a gemstone. Step 1715 can also include recording information for each detected gemstone, such as a reference number or identifier (e.g., gemstone number X of total gemstone count Y) its location within the image and/or corresponding location on the worksurface 1685 and other characteristics determined from the image-based analysis. In some embodiments, the neural network can also be configured to identify and classify other types of non-gemstone objects, if any are depicted in the image.

In some embodiments, the neural network can be trained to analyze the raw image. Additionally, in some embodiments, the neural network's processing of the image can be further informed by the result of step 1710 such as the diagram of detected edges. For example, the image can be enhanced by the edge diagram and the composite image and diagram processed by the neural network. By way of further example, the detected edge information can be provided as an input to an attention mechanism of the neural network such that gemstone detection and classification is performed by the neural network on the image as a function of the result of the edge detection step 1710.

In some embodiments, at step 1720, the processing unit can perform additional image-based analysis operations on the one or more images or related diagrams to determine or measure physical characteristics of the plurality of gemstones and respective gemstones. The result of such operations can facilitate the classification or differentiation of gemstones and can further enable the processing unit 106 to categorize gemstones based on physical characteristics determined from the image(s).

At step 1725, the processing unit performs one or more of a variety of gemstone processing operations as a function of the detection and classification of the gemstones. The gemstone processing operations can be fully automated, partially automated, manually performed based on information output by the system via the output interface 110 or a combination of the foregoing.

For example, in an embodiment, at step 1725, the processing unit can be configured to count the number of gemstones identified within the image. In addition, or alternatively, the processing unit can be configured to facilitate further manual and/or automated gemstone processing operations, including, for example and without limitation, separating out specific quantities of gemstones, sorting the gemstones and other such operations. Accordingly, the processing unit 106 can be configured to facilitate processing operations at step 1725 based on parameters input by an operator including, for example, the particular operation to perform, and criteria for the operation.

As one practical example, the processing unit 106 can be configured to receive an input from the operator that one hundred gemstones are to be separated out from the assortment of gemstones 1650 on the worksurface 1685. Based on the total number of gemstones counted, the processor can be further configured to identify a sub-set of gemstones that meet the input parameters (e.g., one hundred gemstones).

Figure 18:
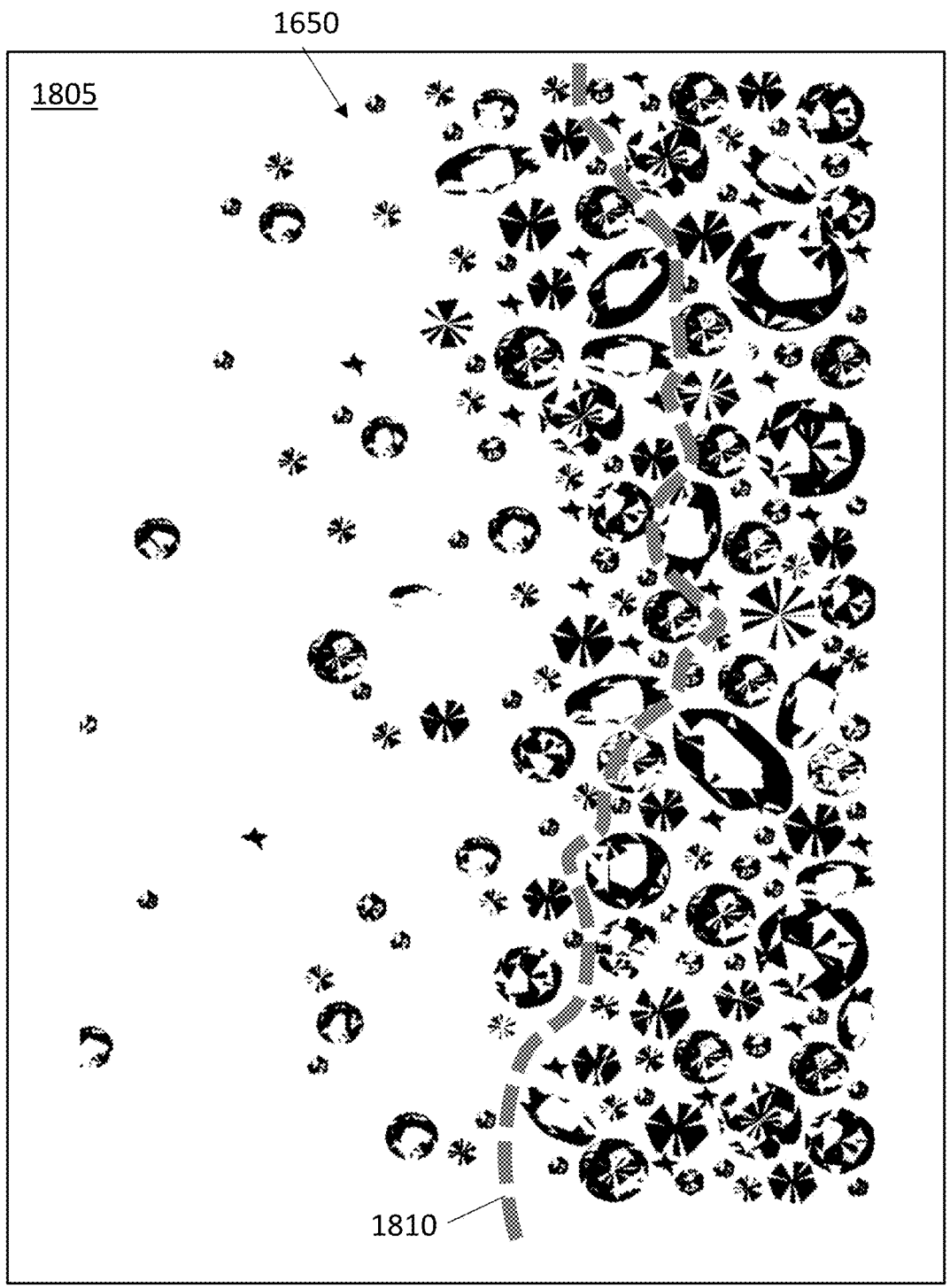
FIG. 18 is a screen shot of an exemplary display output of the system of FIG. 16 showing an image of multiple loose gemstones on a worksurface augmented with markings in accordance with one or more embodiments.

Additionally, the processing unit 106 can be configured to provide an augmented-reality processing tool by outputting, on a visual display of the output system 110, a real-time image of the worksurface and superimpose a virtualized line that visually separates one hundred gemstones from the rest of the gemstones 1650 thereby allowing the operator to physically separate the one hundred gemstones from the remainder based on the image. For instance, FIG. 18 is an exemplary screenshot of the display of the output system 110 showing an image 1805 of the gemstones 1650 on the worksurface 1685 and including a superimposed dividing line 1810 separating a prescribed number of gemstones from the remaining gemstones. Additionally, the foregoing steps for imaging, image-processing and augmented display rendering can be repeated in real-time such that, as the operator is separating out the gemstones, the augmented display output is adapted accordingly. For instance, as the operator moves seventy of the one hundred gems to one side of the worksurface, the output system 110 displays an updated real-time image of the worksurface with an updated dividing line so as to identify the remaining thirty gems for the operator to separate out.

As can be appreciated, when a large quantity of loose gemstones are deposited onto a worksurface, they tend to disperse across the surface non-uniformly. More specifically, the gemstones can come to rest having varying orientations and resting positions (e.g., some are laying on a particular side, some are resting on the top surface, etc.). Additionally, whereas some gems are spread apart, some gemstones can be clumped closely together, touching or even overlapping such that parts of some gemstone are partially obscured in the images. Additionally, gemstones can also be non-uniform in terms of size and shape and color, among other possibly varying physical characteristics. The foregoing can present a variety of practical challenges for automated systems for processing loose gemstones using image-based analysis techniques. For example, in practice, object detection algorithms such as a neural network can have difficulty in reliably differentiating between gemstones that are touching or overlapping. This can lead to sub-standard performance when classifying, counting and processing gemstones based on images containing relatively large quantity of loose gemstones.

Accordingly, the systems and methods disclosed herein are specifically adapted to overcome these and other challenges and provide an automated system that can more accurately and effectively process a plurality of loose gemstones using image-based analysis techniques.

According to a salient aspect, the processing unit 106 can be configured to implement additional image-based processing and analysis steps (e.g., in connection with one or more of steps 710, 715 and/or 720) to improve the operation of the neural network or otherwise improve the ability of the processing unit to detect, differentiate, classify or otherwise measure characteristics of respective gemstones in an image depicting a plurality of gemstones. These and other analysis operations can be performed on the image(s) captured of the gemstones, the diagrams generated therefrom (e.g., edge diagrams, point to point and line to line diagrams), or a combination of the foregoing. Additionally, in some embodiments, the analysis operations can be performed based at least in part on the output of the neural network. Moreover, in some embodiments, the result of the additional image-based analysis operations can be provided as an input to the neural network, prior to image processing using the neural network and/or as feedback to the neural network.

In an embodiment, based on the detection of gemstones by the neural network at step 1715, the processing unit 106 can be configured to analyze the image to determine physical characteristics of the group of gemstones as well as individual gemstones detected by the neural network at step 1720. As shown in FIG. 17, the result can inform further processing at 1725 and be provided as feedback to step 1715.

In an embodiment, the processing unit 106 is configured to analyze an image and/or associated edge diagram using a facet finding algorithm to detect gemstone facets within the image. Based on the detected facets and respective edges, the processing unit can be configured to determine the direction that respective facets extend. Additionally, the processing unit can further be configured to, based on the direction of one or more adjacent or proximate facets, determine the orientation and resting position of a given gemstone. For clarity, the resting position refers to which portion of the gemstone is resting on the worksurface, such as, the gemstone's table, pavilion, crown, or culet and the like. The orientation of the gemstone can refer to, for example, the angle of the central axis of the gemstone relative to the plane of the worksurface.

Additionally, the processing unit 106 can further be configured to differentiate between two abutting or overlapping gemstones based on the facet directions. For instance, a set of one or more facets extending in one direction that are adjacent to a set of one or more facets extending in a substantially different direction can indicate that the first set is associated with a first gemstone and a second set is associated with a second gemstone.

In an embodiment, the processing unit 106 can be configured to detect one or more key parts of respective gemstones from analyzing the images and/or diagrams. Key parts of a gemstone can include, a girdle, a table (e.g. top flat surface), a culet (e.g., bottom point), and one or more facets. The processing unit can be configured to detect two parts of a given gemstone based on relative position or proximity within the image. For instance, upon detection of a girdle within an image and facets adjacent to the top and bottom edges of the girdle, the orientation of the gemstone can be determined based on the orientation of the girdle and angle of adjacent facets relative to the girdle. The processing unit can similarly determine the orientation of a given gemstone based on the relative position of two positively identified key parts of a gemstone, e.g., table and culet, table and facets, culet and facets. Additionally, the size, shape and/or arrangement facets can be used to determine the shape of a gemstone.

It should also be understood that the methods for detecting key parts of gemstones, identifying sets of key parts that are likely to be associated with the same gemstone, determining a gemstone's position or orientation based on the relative position and orientation of key parts can be informed by one or more models representing the expected relationship of key parts for each of a plurality of known gemstone shapes/cuts (e.g., round, oval, princess, cushion, etc.). The models can also specify the expected relationship for each gemstone cut as a function of possible resting positions and orientations on a worksurface.

Similarly, the processor can be configured to determine the cut of a given gemstone in the image by comparing the relative position and orientation of key parts of a given gemstone to the models representing the structural arrangement of key parts for each of the plurality of known gemstone cuts and for each of a plurality of possible resting positions and orientations.

In addition to determining the shape/cut of a gemstone detected in an image, the processing unit 106 can be further configured to determine other physical characteristics of individual gemstones in the image including, for example, the approximate size of each gemstone. More specifically, in an embodiment, the processing unit 106 can be configured to determine the curvature of a girdle of a given gemstone from the one or more images. Based on the curvature of the girdle, an approximation of the girdle's circumference and thus the gemstone's size (e.g., volume and carat weight) can be calculated. The calculation of a gemstone's size can also be informed by the particular cut of the gemstone and other approximated dimensions measured from the image(s) for example, the distance between key parts such as the table and girdle and culet. Size can also be determined based on angles of key parts.

In some embodiments, the processing unit 106 can be configured to determine the curvature of a girdle by analyzing the shape of a given gemstone's girdle as depicted in each a first image of the gemstones, which is taken at a first known angle relative to the worksurface, and a second image of the gemstones taken from a different angle. Preferably, images are captured of the gemstones from at least two different angles to provide sufficient information concerning the 3-dimensional structure of each gemstone (e.g., curvature and shape) to enable the processing unit to estimate the structure and volume of the gemstones respectively.

Although weight estimation from a few images depicting multiple loose gemstones resting in non-uniform positions can result in estimations that are above or below the actual weights, such inaccuracies tend to average out, particularly when the system 1600 is used for processing multiple gemstones at a time, say, separating out twenty-five gemstones having a round cut and average weight of one carat.

In an embodiment, the two or more images can also be used by the processing unit 106 to recreate approximate structure of respective gemstones within the image of the gemstones and generate a diagram for individual gemstones. As noted above, diagrams of individual gemstones can be in the form of point-to-point and line-to-line diagrams representing the overall structure of the gemstone.

In some embodiments, the processing unit 106 can be configured to differentiate/distinguish touching or overlapping gemstones based on multiple images of the gemstones 1650 captured from multiple different angles. For example, gemstone detection at step 1715, can be performed on each image and the results combined. By way of further example, results can be compared to identify any discrepancies or irregular objects that might require further analysis (e.g., at step 1720) using one or more of the gemstone analysis, feature detection, differentiation and measurement techniques described above.

Additionally, in some embodiments, partial views of the gemstones depicted in different images captured at different angles can be combined and used to reconstruct a more complete two-dimensional or three-dimensional image or diagram of the gemstones in accordance with the systems and methods disclosed above. Furthermore, the composite images or diagrams can similarly be analyzed to detect and evaluate partially obstructed gemstones.

In some embodiments, the processing unit 106 can also be configured to measure a grade for the cut ("cut grade") based of the detected edges, facets, girdle, gem structure from either one or more sides of the object. The gemstone can also be configured to generate a diagram that represents the ratios and placements of the parts (like facets and girdle etc.) that makes up the entire structure. Determining a cut grade can also be based on a model of what the "best" cut of a gem or angle of a prong or curvature of a jewelry item should be, which could be based on aesthetics, mathematics, golden ratio, Phi or any given model against which to base off the grading.

In some embodiments, the image capturing device 102 can further include one or more distance or depth measuring sensors, such as LIDAR—laser distance and ranging devices, sonar sensors or other suitable distance or depth measuring devices useable to measure the distance of a target (or portion thereof) from the capturing device 102 and thus measure three-dimensional structure of the target. Based on the measured distance between the image capturing device and gemstones (or parts thereof) being imaged and the focal settings of the camera, the processing unit can be configured to measure a size of the gemstones/parts within the image as well as determine its three-dimensional structure.

In some embodiments, the processing unit 106 can be configured to measure the size and shape of the gemstones using depth from focus techniques. For instance, the image capturing device 102 can be configured to capture a plurality of images while sweeping the focus of the camera through a range of focal settings. The processing unit 106 can be configured to analyze the imagery to identify which portions of one or more gemstones are in focus in respective images and, based on the corresponding focal setting, measure size, shape among other three-dimensional structural characteristics (e.g., curvature etc.) of the one or more gemstones. By way of further example, a trained neural network can be used to analyze the images to visually measure distance from the imagery and/or differences in the focus point and sharpness of areas within the image to find distance or length, width and depth of the imaged objects.

By way of further example, the processing unit 106 can be configured to use the image capturing device 102 to capture images that are each focused on a different part of a gemstone (e.g., the culet, girdle, table, edge, etc.) and analyze the images using a neural network trained to measure distance based on the in-focus and out of focus portions of the image and corresponding focus settings.

In some embodiments, the worksurface can be provided with one or more reference markings such as lines, dots, shapes, letters, numbers and the like to facilitate the image processing, gemstone analysis and gemstone processing operations. The reference markings can be arranged in two or three dimensions and have a prescribed size and spatial relationship. Based on the prescribed spatial relationship of the reference lines, which can be input to the processing unit 106, and a known distance and angle of the image capturing device relative to the worksurface during image capture, the weight of one or more gemstones can be determined based on a comparison of the size of the gemstone relative to one or more of the reference lines. Additionally, in some embodiments, the prescribed location of one or more reference markings can be used to determine the position of each gemstone on the worksurface. In some embodiments, the reference markings can further include encoded instructions that are machine readable and useable to provide instructions to the processing unit 106 or other such computer-vision controlled devices.

Furthermore, in some embodiments, the processing unit 106 can be configured to measure the color of respective gemstones. As can be understood, the physical characteristics respectively measured by the processing unit 106 for the gemstones can be recorded in memory. For example, the position, size, shape, weight, location and color of each gemstone on the work surface can be recorded.

Figure 19:
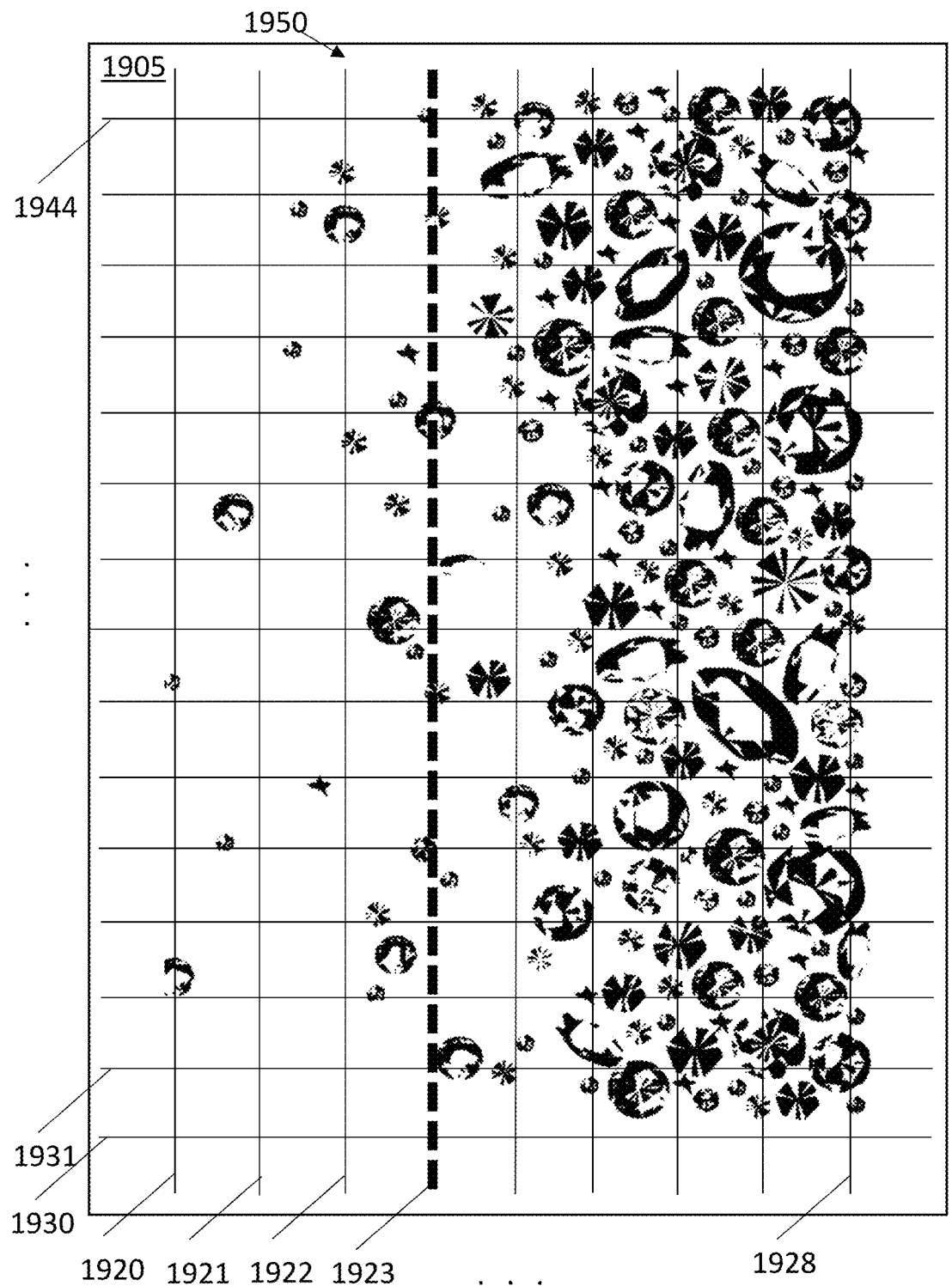
FIG. 19 is a top plan view of an exemplary worksurface of the system of FIG. 16 with reference markings thereon in accordance with one or more embodiments.

Turning to FIG. 19, an exemplary worksurface 1905 is shown that can be utilized with the system 1600 to facilitate the techniques described herein. The dimensions of a gemstone among a plurality of gemstones 1950 and/or features of the gemstone such as a size of a girdle, facets and the like can be determined with reference to the worksurface, which can have one or more reference lines of known thickness and length and/or spacing printed thereon. For example, the worksurface 1804 can have lines 1920-1928 and 1930-1944 arranged in a grid. The spacing of the lines in the grid can assist with determining a size and/or shape of the gemstones. Additionally, the grid can represent a coordinate system used by the processing unit to determine or otherwise assign a respective location to each gemstone in an image.

Analyzing a given gemstone in view of the lines can include processing the captured image to determine one or more dimensions of a given gemstone by comparing image data corresponding to the gemstone to one or more of the lines 1615-1625. In certain embodiments, the worksurface 1604 and/or the lines printed thereon are also or alternatively used to determine one or more shapes of the gemstone 1602 and/or quantify one or more of the aforementioned characteristics of facets, a girdle or other parts of the gemstone.

As noted, in some embodiments, reference markings can be provided in three-dimensions. For instance, although not shown in FIG. 19, one or more side-walls extending vertically (e.g., in the Z direction) from edges of the two-dimensional worksurface 1804 (which extends in the X-Y plane) can be provided with similar reference markings and can be used to determine a height of gemstones in the Z-direction. In another embodiment, the worksurface comprises a gemholder that is a box-like structure.

In certain embodiments, the worksurface can comprise a base that is covered by a piece of paper, a plastic sheet, or other suitable material on which reference markings (e.g., lines, dots, etc.) are printed and gemstones are placed. In some embodiments, the worksurface is transparent, such as a glass substrate, or translucent such that the gemstones can be illuminated by a light source 180 provided below the worksurface.

In some embodiments, reference markings having pre-scribed colors can also be provided on the worksurface, e.g., green, red and blue reference markings. Based on a prescribed hue of the color reference markings, the processing unit 106 can color correct the image and determine the color of respective gemstones.

While a grid pattern is shown in FIG. 19, it should be understood that other types of reference markings and other arrangements of markings can be used to determine gemstone shape, location and orientation, among or other salient physical properties.

In some embodiments, one or more lines can be provided on the worksurface to assist with processing operations such as sorting. For instance, as shown in FIG. 19, the central vertical line 1923 can define a side of the worksurface (e.g., left-side) that gemstones are moved to during a sorting or separating operation (e.g., as performed at step 1725).

One or more of the exemplary physical characteristics of the gemstones determined by the processing unit 106 can be used to perform various gemstone processing operations at step 1725. As noted above, in one example, the system 1600 can be configured to separate out gemstones based solely on gemstone count and without regard to other physical characteristics and user specified parameters/criteria. In a more advanced example, the processing unit 106 can be configured to select a set of gemstones from the assortment of loose gemstones 1650 according to a combination of parameters, such as, a specified number of gemstones having a prescribed total weight and wherein each gemstone has a particular cut/shape and color and a minimum individual weight (e.g., 1 carat minimum).

In an embodiment, the processing unit 106 can be configured to automatically assist with selection of the subset of gemstones by outputting a real-time image of the gemstones 1650 augmented by markings highlighting the gemstones in the set meeting the prescribed criteria. Furthermore, as individual gemstones are selected by the operator, the processing unit can be configured to update the set of gemstones and the augmented display accordingly.

In a further embodiment, the processing unit 106 can facilitate automated gemstone processing at step 1725, for instance, by sending instructions that cause an automated robot to perform the selection and sorting operations. More specifically, the processing unit 106 can be configured to transmit an instruction to a robot via a communication interface (e.g., the output system 110). The instruction can specify a respective location of a plurality of individual gemstones that the processing unit identified as having a prescribed physical characteristic. Additionally, the instruction causes the robot to physically move the plurality of individual gemstones and/or perform other possible processing operations. For instance, the processing unit 106 can instruct a robotic arm to pick up the set of gemstones by specifying the respective coordinate of the gemstones (e.g., as defined by the reference lines/points).

It should be understood that counting and selecting gemstones from among a large quantity of assorted loose gemstones are just a few examples of possible operations that can be performed using the system 1600 based on the image-based analysis techniques described above. The system 1600 can be configured to facilitate the performance of a variety of other gemstone processing operations using robots and/or manual operators.

Additionally, although the foregoing discussion of the system 1600 has been described in the context of processing a plurality of loose gemstones, the system can similarly be used to process a plurality of gemstones that are held by a gemholder or a jewelry item in which the gemstones are set in prongs. For instance, a bracelet having a plurality of gemstones can be laid on the worksurface and the system 1600 can perform one or more steps of the method 1700 accordingly. For example, the number of gemstones can be counted and characteristics evaluated. Additionally, automated processing operations can be performed by the system using, for example, a robot, such as, opening prongs holding certain gemstones, removing the selected gemstones, re-setting the gemstones and the like. By way of further example, the system can be configured to identify missing gemstones from the jewelry item, and suggest a suitable replacement (e.g., based on size, color etc. of the other gemstones), automatically identify a suitable replacement from a set of loose gemstones and set the replacement gemstone into the jewelry item.

It should be understood that although a single gemstone processing system 1600 has been shown and described as processing a set of gemstones on a single worksurface, it should be understood that, in some embodiments, multiple such systems can be networked and configured to communicate so as to perform gemstone processing operations jointly, as an integrated system, and/or independently.

As noted, the system 1600 comprises an input system 108, such as a touchscreen input device by which an operator can provide inputs and instructions to the processing unit 106 that control or otherwise guide operation of the system 1600. For example, an operator viewing the real-time image of the gemstones on the workspace 1685 can tap the touchscreen to select particular gemstones, say, specific gemstones the operator desires to be included in the set of gemstones processed at step 1725.

In some embodiments, the system 1600 can be configured to receive user inputs via the images (e.g., using computer-vision techniques) and adaptively perform one or more of the various gemstone analysis and processing operations discussed above accordingly. For instance, the processing unit 106 can be configured to analyze the images captured by the camera 102 to detect whether they depict the user performing one or more of a prescribed set of gestures that are stored in memory and associated with respective processing operations that the system is pre-programmed to perform. For example, a user pointing a tweezer or other pointing device at a particular gemstone can be interpreted by the processing unit 106 as a selection of that particular gemstone for further analysis (e.g., at step 1715 or 1720) or processing (e.g., at step 1725). By way of further example, a user tapping the particular gemstone a prescribed number of times (e.g., once, twice or three times etc.) is interpreted as an instruction to perform a corresponding operation on that gemstone. By way of further example, the processor can be configured to interpret the pointing of a tweezer at an object or an area on the workspace as an identification of a "point of action" and causes the processing unit 106 to display a set of selectable instructions on an interactive real-time display. Additionally, the processing unit can be configured to receive and act upon voice-commands or other types of commands.

Additionally, in some embodiments, the processor can be configured to analyze markings provided by the user on the worksurface to identify instructions or other such commands. For instance, a user drawing a line around an area can be interpreted as specifying that area as a point of action and to perform processing operations on the gemstones within the area. It should be understood that the processing unit can be configured to receive similar user inputs via a touch-screen display.

By way of further example, instructions can be provided on or within the worksurface (either manually drawn, pre-printed, etched into or embedded within) comprising a diagram including points of action with respective machine readable instruction codes that instruct an automated gemstone processing robot to perform a prescribed operation at the respective point of action. Although the system 1600 comprises one or more elements such as the processing unit 106 and image capturing device 102 provided separately from the output device such as an automated gemstone processing robot, one or more of these components can be integrated into the gemstone processing robot. In some embodiments, a processing unit and image capturing device can be provided on-board the automated gemstone processing robot thereby enabling the gemstone processing robot to perform one or more of the foregoing operations using computer-vision techniques.

It should be understood that various combination, alternatives and modifications of the disclosure could be devised by those skilled in the art. The disclosure is intended to embrace all such alternatives, modifications and variances that fall within the scope of the appended claims.

It is to be understood that like numerals in the drawings represent like elements through the several figures, and that not all components and/or steps described and illustrated with reference to the figures are required for all embodiments or arrangements.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The subject matter described above is provided by way of illustration only and should not be construed as limiting. Various modifications and changes can be made to the subject matter described herein without following the example embodiments and applications illustrated and described, and without departing from the true spirit and scope of the invention encompassed by the present disclosure, which is defined by the set of recitations in the following claims and by structures and functions or steps which are equivalent to these recitations.

What is claimed is:

1. A method for processing a plurality of loose individual gemstones resting on a worksurface, the method comprising:
   receiving, by a computing device having a non-transitory computer-readable storage medium and a processor configured by executing a software program stored in the storage medium, from an image capturing device, at least one image of the plurality of loose individual gemstones on the worksurface;
   detecting, by the processor using a trained neural network analyzing a given one of the at least one image, a plurality of touching gemstones among the plurality of loose individual gemstones, wherein the plurality of touching gemstones are detected within the given one of the at least one image; and
   performing, by the processor based on the detected touching gemstones, a processing operation on the plurality of loose individual gemstones, including the plurality of touching gemstones.

2. The method of claim 1, further comprising:
   detecting, by the processor based on the given image, a physical characteristic of the individual gemstones respectively; and
   wherein the processing operation is performed as a function of the respectively detected physical characteristics.

3. The method of claim 1, wherein performing the processing operation comprises:
   receiving, by the processor via a user interface, a parameter according to which one or more individual gemstones are to be physically separated from the plurality of loose gemstones;
   identifying, by the processor based on the parameter, at least one individual gemstone in the image that satisfies the parameter;
   outputting, by the processor via an associated display device, the image of the plurality of gemstones; and
   rendering, by the processor on the displayed image, one or more superimposed markings in relation to the identified at least one individual gemstone.

4. The method of claim 1, further comprising:
   differentiating between individual gemstones among the touching gemstones.

5. The method of claim 4, wherein the step of detecting touching gemstones includes:
   detecting gemstone features depicted within the given image using a feature detection algorithm;
   detecting the touching gemstones based on relative positions of the detected features; and
   differentiating between the individual gemstones among the touching gemstones as a function of the detected features.

6. The method of claim 5, further comprising:
   detecting individual loose gemstones within the given image among the at least one image, and
   wherein the step of detecting individual gemstones using the neural network is performed as a function of a result of the differentiating step.

7. The method of claim 1, further comprising:
detecting, by the processor based on the given image, at least two parts of each individual gemstone respectively, the at least two parts being selected from the group consisting of a surface, a gemstone feature, a color, a shape, a size, a dimension, a facet, a girdle, a culet, and a table;
measuring, by the processor as a function of a relative position of the detected at least two parts, a characteristic of the individual gemstones respectively, wherein the characteristic is selected from the group consisting of: an orientation, a resting position, a shape, a color, and a size; and
wherein the processing operation is performed as a function of the respectively measured characteristics.

8. The method of claim 7, wherein the worksurface is provided with one or more reference markers, wherein the step of detecting the individual gemstones includes determining respective locations for the individual gemstones as a function of the one or more reference markers, and wherein the measuring step is performed based on the one or more reference markers.

9. The method of claim 1, wherein performing the processing operation comprises:
transmitting via an output interface to a robot in communication therewith, an instruction specifying a respective location of a plurality of individual gemstones having a prescribed physical characteristic and wherein the instruction causes the robot to perform the processing operation on the plurality of individual gemstones.

10. The method of claim 1, wherein the detecting step includes:
analyzing, by the processor, the given image to detect edges of objects within the given image; and
generating a diagram representing the detected edges of the gemstones, wherein the neural network detects the individual gemstones within the given image based on the diagram.

11. The method of claim 1, further comprising, counting the individual gemstones detected within the given image to determine a gemstone count, and wherein the processing operation is performed as a function of the gemstone count.

12. The method of claim 2, wherein the step of detecting a physical characteristic further comprises:
illuminating, while capturing the image, the plurality of gemstones using one or more light sources configured to cause the physical characteristic to stand out in the given image;
detecting at least two overlapping gemstones in the given image using the trained neural network; and
distinguishing features of the at least two overlapping gemstones,
wherein the features include at least the edges of the at least two overlapping gemstones.

13. The method of claim 1, wherein the at least one image comprises a plurality of images, and wherein each image among the plurality of images is captured from a respective angle relative to the worksurface.

14. The method of claim 2, wherein the physical characteristic is selected from a group consisting of: a shape, a weight, a size, a surface feature, an inclusion, and a color.

15. A system for processing a plurality of loose individual gemstones resting on a worksurface, the system comprising:
an image capturing device for capturing at least one image of the plurality of loose individual gemstones on the worksurface; and
a computing device having a non-transitory computer-readable storage medium and a processor, wherein the processor is configured by executing a software application to:
detect, based on a given one of the at least one image using a trained neural network, a plurality of touching gemstones among the plurality of loose individual gemstones, wherein the plurality of touching gemstones are detected within the given one of the at least one image, and
perform, based on the detected touching gemstones, and using an output device, a processing operation on the plurality of loose individual gemstones, including the plurality of touching gemstones.

16. The system of claim 15, wherein the processor is further configured to:
detecting, based on the given image, a physical characteristic of the individual gemstones respectively; and
wherein the processing operation is performed as a function of the physical characteristic.

17. The system of claim 15, further comprising:
a user interface in operative communication with the processor, wherein the processor is configured to receive, via the user interface, a parameter according to which one or more individual gemstones among the plurality of loose gemstones are to be processed;
the output device comprising a display device in operative communication with the processor; and
wherein the processor is configured to perform the processing operation by:
identifying, based on the parameter, a plurality of individual gemstones in the given image that satisfy the parameter,
outputting, by the processor via the display device, the given image of the plurality of gemstones, and
rendering on the displayed image, one or more superimposed markings in relation to the identified at least one individual gemstone.

18. The system of claim 15, wherein the processor is further configured to:
differentiate between individual gemstones among the touching gemstones.

19. The system of claim 18, wherein the neural network is trained to detect the individual gemstones based on the processor differentiating between individual gemstones among touching gemstones.

20. The system of claim 15, wherein the processor is further configured to:
detect, based on the given image, at least two parts of each individual gemstone respectively, the at least two parts being selected from a group consisting of a surface, a gemstone feature, a color, a shape, a size, a dimension, a facet, a girdle, a culet, and a table; and
measure, as a function of a relative position of the detected at least two parts, a characteristic of the individual gemstones respectively, wherein the characteristic is selected from the group consisting of: an orientation, a resting position, a shape, a color, and a size; and
wherein the processor performs the processing operation as a function of the respectively measured physical characteristics.

21. The system of claim 15, further comprising:
the worksurface, wherein the worksurface includes one or more reference markers, and wherein the processor is configured to determine respective locations for the individual gemstones as a function of the one or more reference markers, and wherein the processor performs the processing operation based on the respective locations for the individual gemstones and the one or more parameters.

22. The system of claim 15, wherein the output device comprises a communication interface and wherein the processor is configured to perform the processing operation by:
   transmitting an instruction via the communication interface to an automated gemstone processing robot, the instruction specifying the respective locations of a plurality of individual gemstones having a prescribed physical characteristic and wherein the instruction causes the robot to physically perform the processing operation on the plurality of individual gemstones.

* * * * *